United States Patent
Kubota et al.

(10) Patent No.: US 8,711,312 B2
(45) Date of Patent: Apr. 29, 2014

(54) LIQUID CRYSTAL DISPLAY DEVICE

(75) Inventors: Daisuke Kubota, Kanagawa (JP); Akio Yamashita, Kanagawa (JP); Tetsuji Ishitani, Kanagawa (JP); Tomohiro Tamura, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 476 days.

(21) Appl. No.: 13/083,114

(22) Filed: Apr. 8, 2011

(65) Prior Publication Data

US 2011/0249229 A1    Oct. 13, 2011

(30) Foreign Application Priority Data

Apr. 12, 2010   (JP) ................. 2010-091711

(51) Int. Cl.
G02F 1/1343   (2006.01)
G02F 1/1368   (2006.01)
G02F 1/139    (2006.01)

(52) U.S. Cl.
USPC .............. 349/141; 349/43; 349/167; 349/175

(58) Field of Classification Search
USPC ........... 349/43, 139, 141, 143, 167, 171, 175; 257/43, 59, 72; 345/92
See application file for complete search history.

(56) References Cited

U.S. PATENT DOCUMENTS

| | | |
|---|---|---|
| 5,731,856 A | 3/1998 | Kim et al. |
| 5,744,864 A | 4/1998 | Cillessen et al. |
| 6,097,465 A | 8/2000 | Hiroki et al. |
| 6,175,395 B1 | 1/2001 | Yamazaki et al. |
| 6,266,109 B1 | 7/2001 | Yamaguchi et al. |

(Continued)

FOREIGN PATENT DOCUMENTS

| | | |
|---|---|---|
| EP | 1 737 044 A1 | 12/2006 |
| EP | 2 226 847 A2 | 9/2010 |

(Continued)

OTHER PUBLICATIONS

Fortunato.E et al., "Wide-Bandgap High-Mobility Zno Thin-Film Transistors Produced At Room Temperature,", Appl. Phys. Lett. (Applied Physics Letters), Sep. 27, 2004, vol. 85, No. 13, pp. 2541-2543.

(Continued)

Primary Examiner — Dung Nguyen
Assistant Examiner — Tai Duong
(74) Attorney, Agent, or Firm — Nixon Peabody LLP; Jeffrey L. Costellia

(57) ABSTRACT

A liquid crystal display device using a liquid crystal material exhibiting a blue phase is provided to achieve higher contrast. Further, the power consumption of the liquid crystal display device using a liquid crystal exhibiting a blue phase is reduced. In a liquid crystal display device including: a first substrate provided with a pixel electrode layer (also referred to as a first electrode layer); and a second substrate provided with a common electrode layer (also referred to as a second electrode layer), between which a liquid crystal layer exhibiting a blue phase is interposed, the pixel electrode layer and the common electrode layer project into the liquid crystal layer and are arranged so that the adjacent pixel electrode layer and common electrode layer engage with each other at a distance with the liquid crystal layer interposed therebetween.

34 Claims, 16 Drawing Sheets

(56) References Cited

U.S. PATENT DOCUMENTS

| | | |
|---|---|---|
| 6,294,274 B1 | 9/2001 | Kawazoe et al. |
| 6,449,024 B1 | 9/2002 | Hirakata et al. |
| 6,563,174 B2 | 5/2003 | Kawasaki et al. |
| 6,727,522 B1 | 4/2004 | Kawasaki et al. |
| 7,038,754 B2 | 5/2006 | Hirakata et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,136,128 B2 | 11/2006 | Hirakata et al. |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,307,682 B2 | 12/2007 | Miyachi et al. |
| 7,323,356 B2 | 1/2008 | Hosono et al. |
| 7,327,433 B2 | 2/2008 | Miyachi et al. |
| 7,342,632 B2 | 3/2008 | Miyachi et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,518,700 B2 | 4/2009 | Shibahara et al. |
| 7,576,829 B2 | 8/2009 | Kikuchi et al. |
| 7,674,650 B2 | 3/2010 | Akimoto et al. |
| 7,728,942 B2 | 6/2010 | Hirakata et al. |
| 7,732,819 B2 | 6/2010 | Akimoto et al. |
| 7,830,485 B2 | 11/2010 | You et al. |
| 8,058,647 B2 | 11/2011 | Kuwabara et al. |
| 8,120,746 B2 | 2/2012 | Shibahara et al. |
| 8,188,477 B2 | 5/2012 | Miyairi et al. |
| 8,199,300 B2 | 6/2012 | Hirakata et al. |
| 8,236,635 B2 | 8/2012 | Suzawa et al. |
| 8,319,924 B2 | 11/2012 | Kim et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0179847 A1 | 8/2005 | Miyachi et al. |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0203169 A1 | 9/2006 | Ozawa et al. |
| 2006/0208977 A1 | 9/2006 | Kimura |
| 2006/0227283 A1 | 10/2006 | Ooi et al. |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0126969 A1 | 6/2007 | Kimura et al. |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0259254 A1 | 10/2008 | Kikuchi et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0153761 A1 | 6/2009 | Park et al. |
| 2009/0278122 A1 | 11/2009 | Hosono et al. |
| 2009/0280600 A1 | 11/2009 | Hosono et al. |
| 2010/0053490 A1 | 3/2010 | Kang et al. |
| 2010/0065844 A1 | 3/2010 | Tokunaga |
| 2010/0072471 A1 | 3/2010 | Yamazaki et al. |
| 2010/0092800 A1 | 4/2010 | Itagaki et al. |
| 2010/0109002 A1 | 5/2010 | Itagaki et al. |
| 2010/0165280 A1* | 7/2010 | Ishitani et al. ............ 349/141 |
| 2010/0195028 A1* | 8/2010 | Kubota et al. ............. 349/106 |
| 2010/0245724 A1 | 9/2010 | Nishi et al. |
| 2010/0302492 A1* | 12/2010 | Kubota et al. ............. 349/138 |
| 2011/0075074 A1* | 3/2011 | Gauza et al. ................ 349/96 |
| 2011/0122332 A1* | 5/2011 | Kubota et al. ............... 349/44 |
| 2011/0128491 A1* | 6/2011 | Kubota et al. ............. 349/139 |
| 2011/0141421 A1* | 6/2011 | Lee et al. .................. 349/138 |
| 2011/0249228 A1 | 10/2011 | Kubota et al. |

FOREIGN PATENT DOCUMENTS

| | | |
|---|---|---|
| JP | 60-198861 | 10/1985 |
| JP | 63-210022 | 8/1988 |
| JP | 63-210023 | 8/1988 |
| JP | 63-210024 | 8/1988 |
| JP | 63-215519 | 9/1988 |
| JP | 63-239117 | 10/1988 |
| JP | 63-265818 | 11/1988 |
| JP | 05-251705 | 9/1993 |
| JP | 08-264794 | 10/1996 |
| JP | 11-505377 | 5/1999 |
| JP | 2000-044236 | 2/2000 |
| JP | 2000-150900 | 5/2000 |
| JP | 2002-076356 | 3/2002 |
| JP | 2002-289859 | 10/2002 |
| JP | 2003-086000 | 3/2003 |
| JP | 2003-086808 | 3/2003 |
| JP | 2004-103957 | 4/2004 |
| JP | 2004-273614 | 9/2004 |
| JP | 2004-273732 | 9/2004 |
| JP | 2005-227760 | 8/2005 |
| JP | 2007-171938 | 7/2007 |
| JP | 2008-112022 | 5/2008 |

(56) References Cited

FOREIGN PATENT DOCUMENTS

| JP | 2009-145865 | 7/2009 |
|---|---|---|
| WO | WO 2004/114391 A1 | 12/2004 |
| WO | WO 2005/090520 A1 | 9/2005 |

OTHER PUBLICATIONS

Dembo.H et al., "RFCPUS On Glass And Plastic Substrates Fabricated by TFT Transfer Technology,", IEDM 05: Technical Digest Of International Electron Devices Meeting, Dec. 5, 2005, pp. 1067-1069.

Ikeda.T et al., "Full-Functional System Liquid Crystal Display Using CG-Silicon Technology,", SID Digest '04: SID International Symposium Digest of Technical Papers, 2004, vol. 35, pp. 860-863.

Nomura, K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors By Ar Plasma Treatment,", Appl. Phys. Lett. (Applied Physics Letters) Jun. 26, 2007, vol. 90, No. 26, pp. 262106-1-262106-3.

Takahashi.M et al., "Theoretical Analysis of IGZO Transparent Amorphous Oxide Semiconductor,", IDW '08: Proceedings Of The 15TH International Display Workshops, Dec. 3, 2008, pp. 1637-1640.

Hayashi, R et al., "42.1: Invited Paper: Improved Amorphous In-Ga-Zn-O TFTS,",SID Digest '08: SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the $In_2O_3$-$Ga_2ZnO_4$-$ZnO$ system at 1350°C,", Journal of Solid State Chemistry, Aug. 1, 1991, vol. 93, No. 2, pp. 298-315.

Kimizuka, N et al., "Syntheses and Single-Crystal Data of Homologous Compounds, $In_2O_3(ZnO)_m$ m=3,4, and 5), $InGaO_3(ZnO)_3$, and $Ga_2O_3(ZnO)_m$ (m=7,8,9, and 16) in the $In_2O_3$-$ZnGa_2O_4$-$ZnO$ System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.

Asakuma. N. et al., "Crystallization and Reduction of Sol-Gel-Derived Zinc Oxide Films by Irradiation With Ultraviolet Lamp, ", Journal Of Sol-Gel Science and Technology, 2003, vol. 26, pp. 181-184.

Osada.T et al., "15.2: Development of Driver-Integrated Panel using Amorphous In-Ga-Zn-Oxide TFT,", SID Digest '09: SID International Symposium Digest Of Technical Papers, May 31, 2009, pp. 184-187.

Nomura.K et al., "Carrier transport in transparent oxide semiconductor with intrinsic structural randomness probed using single-crystalline $InGaO_3(ZnO)_5$ films, ", Appl. Phys. Lett. (Applied Physics Letters), Sep. 13, 2004, vol. 85, No. 11, pp. 1993-1995.

Li.C et al., "Modulated Structures of Homologous Compounds $InMO_3(ZnO)_m$ (M=In,Ga; m=Integer) Described by Four-Dimensional Superspace Group, ", Journal Of Solid State Chemistry, 1998, vol. 139, pp. 347-355.

Son.K et al., "42.4L: Late-News Paper: 4 Inch QVGA Amoled Driven by the Threshold Voltage Controlled Amorphous GIZO ($Ga_2O_3$-$In_2O_3$-$ZnO$) TFT, ", SID Digest '08: SID International Symposium Digest Of Technical Papers, May 20, 2008, vol. 39, pp. 633-636.

Lee.J et al., "World'S Largest (15-Inch) XGA AMLCD Panel Using IGZO Oxide TFT,", SID Digest '08: SID International Symposium Digest Of Technical Papers, May 20, 2008, vol. 39, pp. 625-628.

Nowatari.H et al., "60.2: Intermediate Connector With Suppressed Voltage Loss For White Tandem OLEDS, ", SID Digest '09: SID Digest '09 : SID International Symposium Digest Of Technical Papers, May 31, 2009, vol. 40, pp. 899-902.

Kanno.H et al., "White Stacked Electrophosphorecent Organic Light-Emitting Devices Employing MOO3 As A Charge-Generation Layer, ", Adv. Mater. (Advanced Materials), 2006, vol. 18, No. 3, pp. 339-342.

Tsuda.K et al., "Ultra Low Power Consumption Technologies for Mobile TFT-LCDs,", IDW '02: Proceedings Of The 9th International Display Workshops, Dec. 4, 2002, pp. 295-298.

Van de Walle.C, "Hydrogen as a Cause of Doping in Zinc Oxide, ", Phys. Rev. Lett. (Physical Review Letters), Jul. 31, 2000, vol. 85, No. 5, pp. 1012-1015.

Fung.T et al., "2-D Numerical Simulation of High Performance Amorphous In-Ga-Zn-O TFTs for Flat Panel Displays, ", AM-FPD '08 Digest Of Technical Papers, Jul. 2, 2008, pp. 251-252, The Japan Society Of Applied Physics.

Jeong.J et al., "3.1: Distinguished Paper: 12.1-Inch WXGA AMOLED Display Driven by Indium-Gallium-Zinc Oxide TFTs Array, ", SID Digest '08: SID International Symposium Digest Of Technical Papers, May 20, 2008, vol. 39, No. 1, pp. 1-4.

Park.J et al., "High performance amorphous oxide thin film transistors with self-aligned top-gate structure,", IEDM 09: Technical Digest Of International Electron Devices Meeting, Dec. 7, 2009, pp. 191-194.

Kurokawa,Y et al., "UHF RFCPUS On Flexible and Glass Substrates For Secure RFID Systems,", Journal of Solid-State Circuits , 2008, vol. 43, No. 1, pp. 292-299.

Ohara.H et al., "Amorphous In-Ga-Zn-Oxide TFTs with Suppressed Variation for 4.0 inch QVGA AMOLED Display, ", AM-FPD '09 Digest Of Technical Papers, Jul. 1, 2009, pp. 227-230, The Japan Society Of Applied Physics.

Coates.D et al., "Optical Studies Of The Amorphous Liquid-Cholesteric Liquid Crystal Transition: The "Blue Phase", ", Physics Letters, Sep. 10, 1973, vol. 45A, No. 2, pp. 115-116.

Cho.D et al., "21.2:AL And SN-Doped Zinc Indium Oxide Thin Film Transistors For AMOLED Back-Plane, ", SID Digest '09: SID International Symposium Digest Of Technical Papers, May 31, 2009, pp. 280-283.

Lee.M et al., "15.4:Excellent Performance of Indium-Oxide-Based Thin-Film Transistors By DC Sputtering, ", SID Digest '09: SID International Symposium Digest Of Technical Papers, May 31, 2009, pp. 191-193.

Jin.D et al., "65.2:Distinguished Paper:World-Largest (6.5") Flexible Full Color Top Emission Amoled Display on Plastic Film and Its Bending Properties,", SID Digest '09: SID International Symposium Digest of Technical Papers, May 31, 2009, pp. 983-985.

Sakata.J et al., "Development of 4.0-IN. Amoled Display With Driver Circuit Using Amorphous In-Ga-Zn-Oxide TFTS,", IDW '09: Proceedings of the 16TH International Display Workshops, 2009, pp. 689-692.

Park.J et al., "Amorphous Indium-Gallium-Zinc Oxide TFTS And Their Application For Large Size Amoled,", AM-FPD '08 Digest of Technical Papers, Jul. 2, 2008, pp. 275-278.

Park.S et al., "Challenge to Future Displays: Transparent AM-OLED Driven By Peald Grown ZNO TFT,", IMID '07 Digest, 2007, pp. 1249-1252.

Godo.H et al., "Temperature Dependence of Characteristics and Electronic Structure For Amorphous In-Ga-Zn-Oxide TFT,", AM-FPD '09 Digest of Technical Papers, Jul. 1, 2009, pp. 41-44.

Osada.T et al., "Development of Driver-Integrated Panel Using Amorphous In-Ga-Zn-Oxide TFT,", AM-FPD '09 Digest Of Technical Papers, Jul. 1, 2009, pp. 33-36.

Hirao.T et al., "Novel Top-Gate Zinc Oxide Thin-Film Transistors (ZNO TFTS) for AMLCDS,", Journal Of The SID, 2007, vol. 15, No. 1, pp. 17-22.

Hosono.H, "68.3:Invited Paper:Transparent Amorphous Oxide Semiconductors for High Performance TFT,", SID Digest '07: SID International Symposium Digest of Technical Papers, 2007, vol. 38, pp. 1830-1833.

(56) References Cited

OTHER PUBLICATIONS

Godo.H et al., "P-9:Numerical Analysis On Temperature Dependence of Characteristics.Of Amorphous In-Ga-Zn-Oxide TFT,", SID Digest '09: SID International Symposium Digest Of Technical Papers, May 31, 2009, pp. 1110-1112.

Ohara.H et al., "21.3:4.0 in. QVGA Amoled Display Using In-Ga-Zn-Oxide TFTS With A Novel Passivation Layer,", SID Digest '09: SID International Symposium Digest of Technical Papers, May 31, 2009, pp. 284-287.

Miyasaka.M, "Suftla Flexible Microelectronics On Their Way To Business,", SID Digest '07: SID International Symposium Digest Of Technical Papers, 2007, vol. 38, pp. 1673-1676.

Chern.H et al., "An Analytical Model for the Above-Threshold Characteristics Of Polysilicon Thin-Film Transistors, ", IEEE Transactions On Electron Devices, Jul. 1, 1995, vol. 42, No. 7, pp. 1240-1246.

Kikuchi.H et al., "39.1:Invited Paper:Optically Isotropic Nano-Structured Liquid Crystal Composites For Display Applications, ", SID Digest '09: SID International Symposium Digest Of Technical Papers, May 31, 2009, pp. 578-581.

Asaoka.Y at al., "29.1: Polarizer-Free Reflective LCD Combined With Ultra Low-Power Driving Technology, ", SID Digest '09: SID International Symposium Digest Of Technical Papers, May 31, 2009, pp. 395-398.

Lee.H et al., "Current Status Of, Challenges To, And Perspective View Of AM-OLED ,", IDW '06: Proceedings Of The 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases For Display Application, ", SID Digest '07: SID International Symposium Digest Of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N. et al., "Spinel,YBFE204, and YB2FE307 Types of Structures for Compounds in The IN2O3 And SC2O3-A2O3-BO Systems [A; Fe, GA, Or Al; F: Mg, Mn, Fe, Mi, Cu, Or Zn] At Temperatures Over 1000°C,", Journal of Solid State Chemistry, 1985, vol. 60, pp. 382-384.

Kitzerow.H et al., "Observation of Blue Phases In Chiral Networks,", Liquid Crystals, 1993, vol. 14, No. 3, pp. 911-916.

Costello.M et al., "Electron Microscopy Of A Cholesteric Liquid Crystal And Its Blue.Phase,", Phys. Rev. A (Physical Review. A), May 1, 1984, vol. 29, No. 5, pp. 2957-2959.

Meiboom.S et al., "Theory Of The Blue Phase Of Cholesteric Liquid Crystals,", Phys. Rev Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08: SID International Symposium Digest Of Technical Papers, May 20, 2008, vol. 39, pp. 629-632.

Orita.M et al., "Mechanism Of Electrical Conductivity Of Transparent InGaZn04,", Phys. Rev. B (Physical Review. B), Jan. 15, 2000, vol. 61, No. 3, pp. 1811-1816.

Nomura.K et al., "Amorphous Oxide Semiconductors For High-Performance Flexible Thin-Film Transistors,", JPN, J. Appl. Phys. (Japanese Journal Of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties Of Amorphous Indium-Gallium-Zinc Oxide Semiconductor Upon Exposure To Water,", Appl. Phys. Lett. (Applied Physics Letters), 2008, vol. 92, pp. 072104-1-072104-3.

Hsieh.H et al., "P-29:Modeling of Amorphous Oxide Semiconductor Thin Film Transistors and Subgap Density of States,", SID Digest '08: SID International Symposium Digest of Technical Papers, 2008, vol. 39, pp. 1277-1280.

Janotti.A et al., "Oxygen Vacancies in ZnO,", Appl. Phys. Lett. (Applied Physics Letters), 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal Of Non-Crystalline Solids), 1996, vol. 198-200, pp. 165-169. .

Mo.Y et al., "Amorphous Oxide TFT Backplanes for Large Size AMOLED Displays,", IDW '08: Proceedings Of The 6TH International Display Workshops, Dec. 3, 2008, pp. 581-584.

Kim.S et al., "High-Performance oxide thin film transistors passivated by various gas plasmas,", 214TH ECS Meeting, 2008, No. 2317, ECS.

Clark.S et al., "First Principles Methods Using Castep,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving The Gate Stability Of Zno Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters) , Sep. 1, 2003, vol. 83, No. 9, pp. 1755-1757.

\* cited by examiner

LIQUID CRYSTAL DISPLAY DEVICE

BACKGROUND OF THE INVENTION

1. Field of the Invention

The present invention relates to a liquid crystal display device and a manufacturing method thereof.

2. Description of the Related Art

As thin and lightweight display devices (so-called flat panel displays), liquid crystal display devices including liquid crystal elements, light-emitting devices including self-luminous elements, field-emission displays (FEDs), and the like have been competitively developed.

In liquid crystal display devices, higher-speed response of liquid crystal molecules has been required. Among various kinds of display modes of a liquid crystal, liquid crystal modes capable of high-speed response are a ferroelectric liquid crystal (FLC) mode, an optical compensated birefringence (OCB) mode, and a mode using a liquid crystal exhibiting a blue phase.

In particular, the mode using a liquid crystal exhibiting a blue phase does not require an alignment film and provides a wide viewing angle, and thus has been developed more actively for practical use (see Patent Document 1, for example). Patent Document 1 reports that polymer stabilization treatment is performed on a liquid crystal to extend the temperature range in which a blue phase appears.

REFERENCE

Patent Document

[Patent Document 1] PCT International Publication No. 05/090520

SUMMARY OF THE INVENTION

In order to achieve high contrast of a liquid crystal display device, white transmittance (light transmittance in white display) needs to be high.

Thus, in order to achieve higher contrast, an object of the present invention is to provide a liquid crystal display device which is suitable for a liquid crystal display mode using a liquid crystal exhibiting a blue phase.

Another object of the present invention is to achieve lower power consumption of a liquid crystal display device using a liquid crystal exhibiting a blue phase.

In a liquid crystal display device including: a first substrate provided with a pixel electrode layer (also referred to as a first electrode layer); and a second substrate provided with a common electrode layer (also referred to as a second electrode layer), between which a liquid crystal layer exhibiting a blue phase is interposed, the pixel electrode layer and the common electrode layer project into the liquid crystal layer and are arranged so that the adjacent pixel electrode layer and common electrode layer engage with each other at a distance with the liquid crystal layer interposed therebetween.

The distance between the pixel electrode layer and the common electrode layer, which are adjacent to each other with the liquid crystal layer interposed therebetween, is a distance at which a liquid crystal in the liquid crystal layer between the pixel electrode layer and the common electrode layer responds to a predetermined voltage which is applied to the pixel electrode layer and the common electrode layer. The voltage applied is controlled depending on the distance as appropriate.

The positions of the pixel electrode layer and the common electrode layer in the liquid crystal layer can be controlled by providing structure bodies under the pixel electrode layer and the common electrode layer.

In a liquid crystal display device including a first substrate and a second substrate, between which a liquid crystal layer exhibiting a blue phase is interposed, a pixel electrode layer is formed to cover the top and side surfaces of a rib-shaped first structure body which projects into the liquid crystal layer from the surface of the first substrate on the liquid crystal layer side (the surface facing the liquid crystal layer). A common electrode layer (also referred to as a second electrode layer) is formed to cover the top and side surfaces of a rib-shaped second structure body which projects into the liquid crystal layer from the surface of the second substrate on the liquid crystal layer side.

In the in-plane direction, the pixel electrode layer, the common electrode layer, the rib-shaped first structure body, and the rib-shaped second structure body do not have a plate shape but have a variety of opening patterns (slits) and include a bent portion or a branching comb-like shape. The pixel electrode layer and the common electrode layer, as well as the first structure body and the second structure body, are formed so as not to overlap with each other when the first substrate faces the second substrate.

On the other hand, in the thickness (film thickness) direction, the first structure body and the second structure body are fixed with a sealant in such a manner that, when the first substrate and the second substrate are arranged so that the surface provided with the first structure body faces the surface provided with the second structure body, the rib-shaped projections engage with each other with the liquid crystal layer interposed therebetween.

The pixel electrode layer and the common electrode layer are arranged to project into the liquid crystal layer so that the side surfaces thereof are adjacent to each other, whereby the area where the pixel electrode layer and the common electrode layer are formed can be increased in the thickness direction of the liquid crystal layer (three-dimensionally). Consequently, when a voltage is applied between the pixel electrode layer and the common electrode layer, an electric field can be widely formed between the pixel electrode layer and the common electrode layer.

In order to arrange the pixel electrode layer (or the pixel electrode layer and the first structure body) such that its side surfaces are in parallel with the side surfaces of the common electrode layer (or the common electrode layer and the second structure body), the sum of the maximum film thickness of the pixel electrode layer (or the pixel electrode layer and the first structure body) and the maximum film thickness of the common electrode layer (or the common electrode layer and the second structure body) is set to be greater than the maximum thickness of the liquid crystal layer (also referred to as the cell gap of the liquid crystal display device).

However, the total thickness (film thickness) of the structure body (the first structure body or the second structure body) and the electrode layer (the pixel electrode layer or the common electrode layer) is set to be less than the maximum thickness of the liquid crystal layer, so that the pixel electrode layer or the common electrode layer formed on the first structure body or the second structure body does not reach the opposite first substrate or second substrate.

In the case where the pixel electrode layer and the common electrode layer are formed on the first structure body or the second structure body, the pixel electrode layer and the common electrode layer are formed at least on the top and side surfaces of the rib-shaped first structure body or second structure body. At least one of the pixel electrode layer and the common electrode layer may also be formed in a flat region in a pixel other than the surfaces of the first structure body or second structure body. For example, the pixel electrode layer, to which a voltage controlled for each pixel is applied, can be formed as a plate-like conductive film continuous in each pixel, and the common electrode layer, to which a voltage common to all pixels is applied, can be formed as a plate-like conductive film continuous in a pixel region including a plurality of pixels.

An increase in the area where the pixel electrode layer and the common electrode layer are formed allows increasing the area where an electric field is formed in the liquid crystal layer, whereby liquid crystal molecules can be controlled more efficiently.

It is thus possible to make liquid crystal molecules respond in the entire liquid crystal layer including the thickness direction, resulting in an improvement in white transmittance. Consequently, the contrast ratio, which is the ratio of white transmittance to black transmittance (light transmittance in black display), can also be increased. In addition, low power consumption can be achieved because an electric field can be effectively applied even to a liquid crystal material (a liquid crystal mixture) exhibiting a blue phase, which has high viscosity.

The structure body can be formed using an insulator made of an insulating material (an organic material and an inorganic material) and a conductor made of a conductive material (an organic material and an inorganic material). Typically, it is preferable to use a visible light curable resin, an ultraviolet curable resin, or a thermosetting resin. For example, an acrylic resin, an epoxy resin, or an amine resin can be used. Alternatively, the structure body can be formed using a conductive resin or a metal material. Note that the structure body may have a stacked structure of plural thin films.

The structure body can have a columnar shape, a conical or pyramidal shape with a plane top surface and a trapezoidal cross section, a conical or pyramidal shape with a rounded dome top surface, or the like. In this specification, since a pixel electrode layer and a common electrode layer are formed to cover surfaces (top surfaces and side surfaces) of structure bodies, it is preferable that the structure bodies each have a rib shape with a curved surface with little unevenness so as to be favorably covered with the pixel electrode layer and the common electrode layer. Further, a material having light-transmitting properties with respect to visible light is preferably used for the structure bodies because reduction in aperture ratio and white transmittance can be prevented.

Furthermore, each of the structure bodies may be a portion which projects into the liquid crystal layer from the surface of the substrate on the liquid crystal layer side; thus, a projecting structure body may be formed by processing an interlayer film so that the surface on the liquid crystal layer side is uneven. Accordingly, the structure bodies may be formed using a continuous film provided with a plurality of projections.

In this specification, a substrate which is provided with a semiconductor element (e.g., a transistor), a first structure body, and a pixel electrode layer, is referred to as an element substrate (a first substrate), and a substrate which faces the element substrate with a liquid crystal layer interposed therebetween is referred to as a counter substrate (a second substrate). Note that a second structure body and a common electrode layer are provided between the counter substrate (the second substrate) and the liquid crystal layer.

A liquid crystal material exhibiting a blue phase is used for the liquid crystal layer. Note that a liquid crystal material refers to a mixture which includes a liquid crystal and is used for a liquid crystal layer. The liquid crystal material exhibiting a blue phase has a short response time of 1 msec or less and is capable of high-speed response. Thus, a high-performance liquid crystal display device can be achieved.

The liquid crystal material exhibiting a blue phase includes a liquid crystal and a chiral agent. The chiral agent is used to align the liquid crystal in a helical structure so that the liquid crystal exhibits a blue phase. For example, a liquid crystal material into which a chiral agent is mixed at several weight percent or more may be used for the liquid crystal layer.

As the liquid crystal, a thermotropic liquid crystal, a low molecular liquid crystal, a high molecular liquid crystal, a ferroelectric liquid crystal, an anti-ferroelectric liquid crystal, or the like is used.

For the chiral agent, a material which has a high compatibility with a liquid crystal and has a strong twisting power is used. In addition, either an R-enantiomer or an S-enantiomer is favorable as the material, and a racemic body in which an R-enantiomer and an S-enantiomer are mixed at a ratio of 50:50 is not used.

The above liquid crystal material exhibits a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are observed in a liquid crystal material having a cholesteric phase or a smectic phase with a relatively short helical pitch of 500 nm or less. The alignment of the liquid crystal material has a double twist structure. Having the order of less than or equal to the wavelength of visible light, the liquid crystal material is transparent, and optical modulation action is generated through a change in alignment order by voltage application. A blue phase is optically isotropic and thus has no viewing angle dependence. Consequently, an alignment film is not necessarily formed, which results in an improvement in display image quality and cost reduction.

The blue phase is exhibited only within a narrow temperature range; therefore, in order to extend the temperature range, it is preferable that a photocurable resin and a photopolymerization initiator be added to a liquid crystal material and polymer stabilization treatment be performed. The polymer stabilization treatment is performed in such a manner that a liquid crystal material including a liquid crystal, a chiral agent, a photocurable resin, and a photopolymerization initiator is irradiated with light having a wavelength with which the photocurable resin and the photopolymerization initiator are reacted. Light irradiation in this polymer stabilization treatment may be performed on a liquid crystal material exhibiting either an isotropic phase or a blue phase under the control of temperature.

For example, the polymer stabilization treatment is performed in such a manner that the temperature of a liquid crystal layer is controlled so that the liquid crystal layer exhibiting a blue phase is irradiated with light. Note that the polymer stabilization treatment is not limited to this manner and may be performed in such a manner that light irradiation is performed on a liquid crystal layer exhibiting an isotropic phase at a temperature within +10° C., preferably +5° C. from the phase transition temperature between the blue phase and the isotropic phase. The phase transition temperature between the blue phase and the isotropic phase is a temperature at which the phase changes from the blue phase to the isotropic phase when the temperature is raised, or a temperature at which the phase changes from the isotropic phase to the blue phase when the temperature is lowered. As an example of the polymer stabilization treatment, the following method can be employed: after heating a liquid crystal layer to exhibit an isotropic phase, the temperature is gradually lowered so that the phase changes to a blue phase, and then light irradiation is performed while keeping the temperature at which the blue phase is exhibited. Alternatively, after the phase changes to an isotropic phase by gradually heating a liquid crystal layer, the liquid crystal layer can be irradiated with light at a temperature within +10° C., preferably +5° C. from the phase transition temperature between the blue phase and the isotropic phase (a temperature at which the isotropic phase is exhibited). In the case where an ultraviolet curable resin (a UV curable resin) is used as the photocurable resin included in the liquid crystal material, the liquid crystal layer may be irradiated with ultraviolet rays. Even in the case where a blue phase is not exhibited, if polymer stabilization treatment is performed by irradiation with light at a temperature within +10° C., preferably +5° C. from the phase transition temperature between the blue phase and the isotropic phase (a temperature at which the isotropic phase is exhibited), the response time can be made as short as 1 msec or less to realize high-speed response.

One embodiment of a structure of the invention disclosed in this specification is a liquid crystal display device including: a first substrate provided with a first electrode layer; and a second substrate provided with a second electrode layer, between which a liquid crystal layer including a liquid crystal material exhibiting a blue phase is interposed. The first electrode layer and the second electrode layer project into the liquid crystal layer and are arranged so that the adjacent first electrode layer and second electrode layer engage with each other at a distance with the liquid crystal layer interposed therebetween.

Another embodiment of a structure of the invention disclosed in this specification is a liquid crystal display device including: a first substrate provided with a first electrode layer; and a second substrate provided with a second electrode layer, between which a liquid crystal layer including a liquid crystal material exhibiting a blue phase is interposed. The first electrode layer and the second electrode layer project into the liquid crystal layer and are arranged so that the adjacent first electrode layer and second electrode layer engage with each other at a distance with the liquid crystal layer interposed therebetween. The distance between the first electrode layer and the second electrode layer is a distance at which a liquid crystal in the liquid crystal layer between the first electrode layer and the second electrode layer responds to a predetermined voltage which is applied to the first electrode layer and the second electrode layer.

Still another embodiment of a structure of the invention disclosed in this specification is a liquid crystal display device including: a first substrate and a second substrate between which a liquid crystal layer including a liquid crystal material exhibiting a blue phase is interposed; a rib-shaped first structure body which projects into the liquid crystal layer from a surface of the first substrate on the liquid crystal layer side; a rib-shaped second structure body which projects into the liquid crystal layer from a surface of the second substrate on the liquid crystal layer side; a first electrode layer which covers the top and side surfaces of the rib-shaped first structure body; and a second electrode layer which covers the top and side surfaces of the rib-shaped second structure body. The first electrode layer and the second electrode layer are arranged so as to engage with each other at a distance with the liquid crystal layer interposed therebetween.

Yet still another embodiment of a structure of the invention disclosed in this specification is a liquid crystal display device including: a first substrate and a second substrate between which a liquid crystal layer including a liquid crystal material exhibiting a blue phase is interposed; a rib-shaped first structure body which projects into the liquid crystal layer from a surface of the first substrate on the liquid crystal layer side; a rib-shaped second structure body which projects into the liquid crystal layer from a surface of the second substrate on the liquid crystal layer side; a first electrode layer which covers top and side surfaces of the rib-shaped first structure body; and a second electrode layer which covers top and side surfaces of the rib-shaped second structure body. The first electrode layer and the second electrode layer are arranged so as to engage with each other at a distance with the liquid crystal layer interposed therebetween. The distance between the first electrode layer and the second electrode layer is a distance at which a liquid crystal in the liquid crystal layer between the first electrode layer and the second electrode layer responds to a predetermined voltage which is applied to the first electrode layer and the second electrode layer.

Since an alignment film does not need to be formed when the liquid crystal layer exhibiting a blue phase is used, the first electrode layer (the pixel electrode layer) can be formed in contact with the liquid crystal layer, and the second electrode layer (the common electrode layer) can be formed in contact with the liquid crystal layer.

Note that the ordinal numbers such as "first" and "second" are used for convenience and do not denote the order of steps and the stacking order of layers. Further, the ordinal numbers in this specification do not denote particular names which specify the invention.

Note that in this specification, semiconductor devices refer to all devices which can function by utilizing semiconductor characteristics, and electro-optical devices, semiconductor circuits, and electronic devices are all included in the category of semiconductor devices.

In a liquid crystal display device including: a first substrate provided with a pixel electrode layer; and a second substrate provided with a common electrode layer, between which a liquid crystal layer exhibiting a blue phase is interposed, the pixel electrode layer and the common electrode layer project into the liquid crystal layer and are arranged so that the adjacent pixel electrode layer and common electrode layer engage with each other at a distance with the liquid crystal layer interposed therebetween.

Accordingly, when a voltage is applied between the pixel electrode layer and the common electrode layer, an electric field can be widely formed between the pixel electrode layer and the common electrode layer, and liquid crystal molecules can be controlled using the electric field.

It is thus possible to make liquid crystal molecules respond in the entire liquid crystal layer including the thickness direction, resulting in an improvement in white transmittance. Consequently, the contrast ratio can be increased in a liquid crystal display device using a liquid crystal layer exhibiting a blue phase.

In addition, low power consumption of the liquid crystal display device can be achieved because an electric field can be effectively applied even to a liquid crystal layer exhibiting a blue phase, which has high viscosity.

BRIEF DESCRIPTION OF THE DRAWINGS

In the accompanying drawings.

FIGS. 5A1, 5A2, and 5B illustrate liquid crystal display modules;

DETAILED DESCRIPTION OF THE INVENTION

Figure 1:
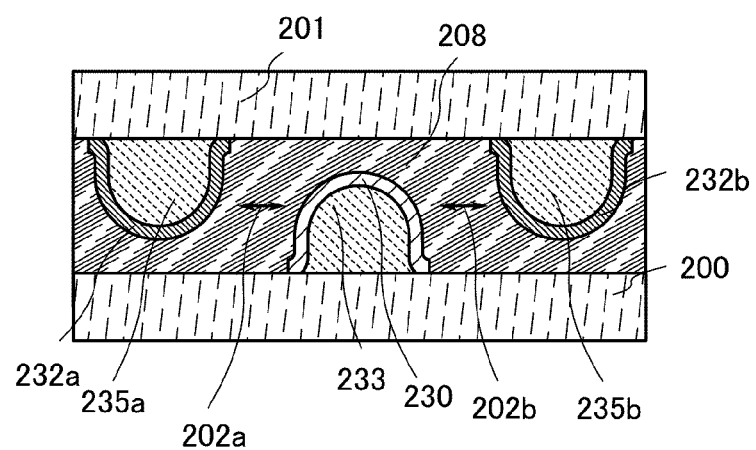
FIG. 1 illustrates a liquid crystal display device.

Embodiments will be described in detail with reference to drawings. Note that the present invention is not limited to the following description, and it is apparent to those skilled in the art that modes and details can be modified in various ways without departing from the spirit and scope of the present invention. Therefore, the present invention is not construed as being limited to the description of the embodiments given below. Note that in the structures explained below, like portions or portions having a similar function are denoted by like reference numerals in different drawings, and the description thereof is omitted.

Embodiment 1

A liquid crystal display device which is an embodiment of a structure of the invention disclosed in this specification will be described with reference to FIG. 1. FIG. 1 is a cross-sectional view of the liquid crystal display device.

In a liquid crystal display device which includes a liquid crystal layer exhibiting a blue phase, the gray scale can be controlled by generating an electric field generally parallel to a substrate (i.e., in a lateral direction) to move liquid crystal molecules in a plane parallel to the substrate.

Figure 16:
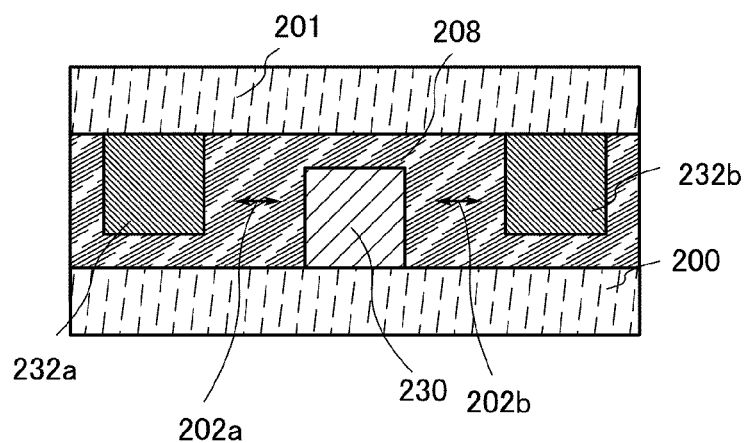
FIG. 16 illustrates a liquid crystal display device.

FIG. 16 is a liquid crystal display device including a first substrate 200 and a second substrate 201 which face each other and between which a liquid crystal layer 208 using a liquid crystal material exhibiting a blue phase is interposed. A pixel electrode layer 230 is provided between the first substrate 200 and the liquid crystal layer 208, and common electrode layers 232a and 232b are provided between the second substrate 201 and the liquid crystal layer 208. The pixel electrode layer 230 projects into the liquid crystal layer 208 from a surface of the first substrate 200 on the liquid crystal layer 208 side, and the common electrode layers 232a and 232b project into the liquid crystal layer 208 from a surface of the second substrate 201 on the liquid crystal layer 208 side.

In the thickness (film thickness) direction, the pixel electrode layer 230 and the common electrode layers 232a and 232b project into the liquid crystal layer 208 exhibiting a blue phase, and are arranged so that the adjacent pixel electrode layer and common electrode layers engage with each other at a distance with the liquid crystal layer 208 interposed therebetween.

The distance between the pixel electrode layer 230 and the common electrode layers 232a and 232b, which are adjacent to each other with the liquid crystal layer 208 interposed therebetween, is a distance at which a liquid crystal in the liquid crystal layer 208 between the pixel electrode layer 230 and the common electrode layers 232a and 232b responds to a predetermined voltage which is applied to the pixel electrode layer 230 and the common electrode layers 232a and 232b. The voltage applied is controlled depending on the distance as appropriate.

The positions of the pixel electrode layer 230 and the common electrode layers 232a and 232b in the liquid crystal layer 208 can be controlled by providing structure bodies under the pixel electrode layer 230 and the common electrode layers 232a and 232b.

FIG. 1 is a liquid crystal display device including the first substrate 200 and the second substrate 201 which face each other and between which the liquid crystal layer 208 using a liquid crystal material exhibiting a blue phase is interposed. A first structure body 233 and the pixel electrode layer 230 are provided between the first substrate 200 and the liquid crystal layer 208, and second structure bodies 235a and 235b and the common electrode layers 232a and 232b are provided between the second substrate 201 and the liquid crystal layer 208. The first structure body 233 projects into the liquid crystal layer 208 from the surface of the first substrate 200 on the liquid crystal layer 208 side, and the second structure bodies 235a and 235b project into the liquid crystal layer 208 from the surface of the second substrate 201 on the liquid crystal layer 208 side.

The pixel electrode layer 230 is formed to cover the top and side surfaces of the first structure body 233 which projects into the liquid crystal layer 208 from the surface of the first substrate 200 on the liquid crystal layer 208 side (the surface facing the liquid crystal layer 208). The common electrode layers 232a and 232b are formed to cover the top and side surfaces of the second structure bodies 235a and 235b which project into the liquid crystal layer 208 from the surface of the second substrate 201 on the liquid crystal layer 208 side.

In the in-plane direction (a top view of the liquid crystal display device), the pixel electrode layer 230 and the common electrode layers 232a and 232b have an opening pattern and include a bent portion or a branching comb-like shape. The pixel electrode layer 230 and the common electrode layers 232a and 232b are formed so as not to overlap with each other when the first substrate 200 faces the second substrate 201.

Thus, in the in-plane direction (the top view of the liquid crystal display device), the shapes of the rib-shaped first structure body 233 and the second structure bodies 235a and 235b, which reflect the shapes of the pixel electrode layer 230 and the common electrode layers 232a and 232b respectively, also have an opening pattern and include a bent portion or a branching comb-like shape.

In the thickness (film thickness) direction, as illustrated in the cross-sectional view of FIG. 1, the first structure body 233 and the second structure bodies 235a and 235b are fixed with a sealant in such a manner that, when the first substrate 200 and the second substrate 201 are arranged so that the surface provided with the first structure body 233 faces the surface provided with the second structure bodies 235a and 235b, the rib-shaped projections engage with each other with the liquid crystal layer 208 interposed therebetween.

In order to arrange the pixel electrode layer 230 (or the pixel electrode layer 230 and the first structure body 233) such that its side surfaces are in parallel with the side surfaces of the common electrode layers 232a and 232b (or the common electrode layers 232a and 232b and the second structure bodies 235a and 235b), the sum of the maximum film thickness of the pixel electrode layer 230 (or the pixel electrode layer 230 and the first structure body 233) and the maximum film thickness of the common electrode layers 232a and 232b (or the common electrode layers 232a and 232b and the second structure bodies 235a and 235b) is set to be greater than the maximum thickness of the liquid crystal layer 208 (also referred to as the cell gap of the liquid crystal display device).

The maximum thickness (film thickness) of the liquid crystal layer 208 is preferably greater than or equal to 1 μm and less than or equal to 20 μm.

However, the total thickness of the first structure body 233 and the pixel electrode layer 230, and the total thickness (film thickness) of the second structure body 235a or 235b and the common electrode layer 232a or 232b, are each set to be less than the thickness of the liquid crystal layer 208 in the formation region, so that the pixel electrode layer 230 formed on the first structure body 233, or the common electrode layers 232a and 232b formed on the second structure bodies 235a and 235b, do not reach the opposite first substrate 200 or second substrate 201.

The distance between the pixel electrode layer 230 and the common electrode layer 232a or the common electrode layer 232b, which are adjacent to each other with the liquid crystal layer 208 interposed therebetween, is a distance at which a liquid crystal in the liquid crystal layer 208 between the electrode layers responds to a predetermined voltage which is applied to the pixel electrode layer 230 and the common electrode layers 232a and 232b. The minimum distance between the side surfaces of the pixel electrode layer 230 and the common electrode layer 232a or the common electrode layer 232b, which are adjacent to each other with the liquid crystal layer 208 interposed therebetween, is longer than or equal to 0.5 μm and shorter than or equal to 30 μm, and preferably longer than or equal to 1 μm and shorter than or equal to 10 μm. The voltage applied is controlled depending on the distance as appropriate.

Note that in this specification, the distance between the adjacent pixel electrode layer and common electrode layer refers to the minimum distance between the projections of the pixel electrode layer and the common electrode layer (the side surfaces in the cross-sectional view of FIG. 1), which project into the liquid crystal layer. It is possible to make liquid crystals respond to an electric field formed between the side surfaces of the adjacent pixel electrode layer and common electrode layer.

Thus, the minimum distance between the side surfaces of the first structure body 233 and the second structure body 235a or 235b, which are adjacent to each other with the liquid crystal layer 208 interposed therebetween, is longer than or equal to 0.5 μm and shorter than or equal to 30 μm, and preferably longer than or equal to 1 μm and shorter than or equal to 10 μm. The voltage applied to the pixel electrode layer 230 and the common electrode layers 232a and 232b is controlled depending on the distance as appropriate.

FIG. 16 shows an example in which the pixel electrode layer 230 and the common electrode layers 232a and 232b have a columnar shape without using structure bodies.

The first structure body 233 and the second structure bodies 235a and 235b have a dome shape with a rounded top and an almost semicircular cross section. When the structure body has such a curved surface, the pixel electrode layer 230 and the common electrode layers 232a and 232b can be stacked thereon with good coverage to have a favorable shape.

Since the common electrode layers 232a and 232b and second structure bodies 235a and 235b have an opening pattern, they are illustrated as divided plural electrode layers or structure bodies in the cross-sectional views of FIG. 1 and FIG. 16.

The pixel electrode layer 230 is formed to cover the top and side surfaces of the rib-shaped first structure body 233 provided on the first substrate 200, and the common electrode layers 232a and 232b are formed to cover the top and side surfaces of the rib-shaped second structure bodies 235a and 235b provided on the second substrate 201. As a result, the area where the pixel electrode layer 230 and the common electrode layers 232a and 232b are formed can be increased in the thickness direction of the liquid crystal layer 208 (three-dimensionally). Further, the first substrate 200 and the second substrate 201 are arranged to face each other so that the projections formed on the surfaces of the pixel electrode layer 230 and the common electrode layers 232a and 232b, which cover the first structure body 233 and the second structure bodies 235a and 235b respectively, engage with each other. Consequently, as illustrated in FIG. 1, an electric field substantially parallel to the first substrate 200 and the second substrate 201 indicated by an arrow 202a between the pixel electrode layer 230 and the common electrode layer 232a, and an electric field substantially parallel to the first substrate 200 and the second substrate 201 indicated by an arrow 202b between the pixel electrode layer 230 and the common electrode layer 232b, are widely applied in the thickness direction of the liquid crystal layer. Although not illustrated, the electric field is also formed circularly around the pixel electrode layer 230 and the common electrode layers 232a and 232b.

The pixel electrode layer, the common electrode layer, and the structure body can have a columnar shape, a conical or pyramidal shape with a plane top surface and a trapezoidal cross section, a conical or pyramidal shape with a rounded dome top surface, or the like. In the case where the pixel electrode layer and the common electrode layer are formed to cover the surfaces (the top and side surfaces) of the structure bodies, it is preferable that the structure bodies have a shape with a curved surface with little unevenness so as to be favorably covered with the pixel electrode layer and the common electrode layer. Further, a material having light-transmitting properties with respect to visible light is preferably used for the structure bodies because reduction in aperture ratio and white transmittance can be prevented.

Furthermore, each of the structure bodies may be a portion which projects into the liquid crystal layer from the surface of the substrate on the liquid crystal layer side; thus, a projecting structure body may be formed by processing an interlayer film so that the surface on the liquid crystal layer side is uneven. Accordingly, the structure bodies may be formed using a continuous film provided with a plurality of projections.

Figure 11A:
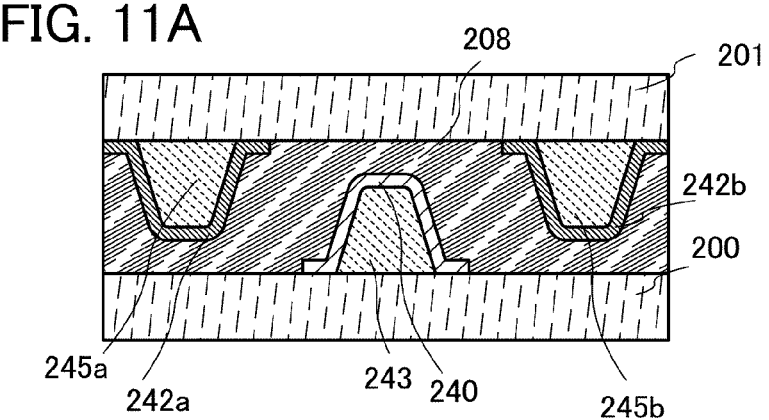
FIGS. 11A to 11C illustrate liquid crystal display devices.
Figure 11B:
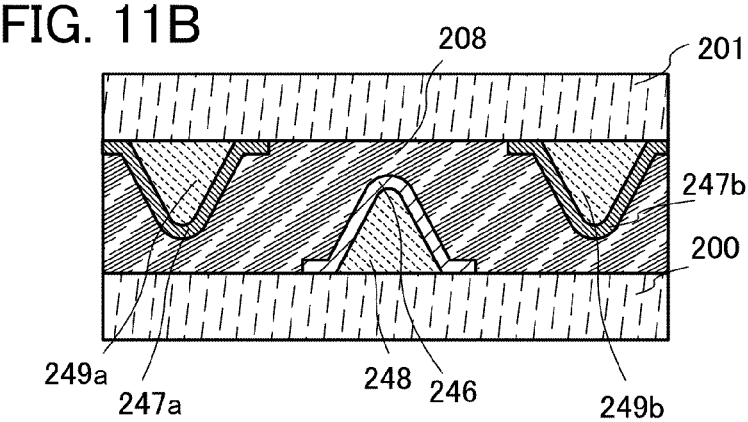
Figure 11C:
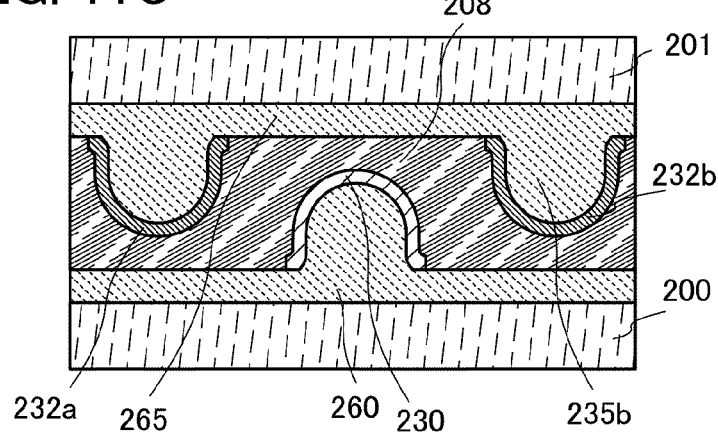

Note that the shapes of the pixel electrode layer and the common electrode layer which are formed on the structure bodies reflect the shapes of the structure bodies and are also influenced by an etching process. FIGS. 11A to 11C illustrate examples of the shapes of a structure body, and a pixel electrode layer and a common electrode layer which are formed on the structure body.

FIG. 11A illustrates an example in which a pixel electrode layer 240 and common electrode layers 242a and 242b are formed on a first structure body 243 and second structure bodies 245a and 245b, respectively. The first structure body 243 and the second structure bodies 245a and 245b each have a conical or pyramidal shape with a plane top surface and a trapezoidal cross section, and the shapes of the pixel electrode layer 240 and the common electrode layers 242a and 242b which are formed to cover the structure bodies reflect that shape. The pixel electrode layer 240 and the common electrode layers 242a and 242b are formed in contact with the first substrate 200 or the second substrate 201.

As described above, the pixel electrode layer and the common electrode layer are formed at least on the top and side surfaces of the rib-shaped first structure body or second structure body. At least one of the pixel electrode layer and the common electrode layer may also be formed in a flat region in a pixel other than the surfaces of the first structure body or second structure body.

FIG. 11B illustrates an example in which a pixel electrode layer 246 and common electrode layers 247a and 247b are formed on a first structure body 248 and second structure bodies 249a and 249b, respectively. The first structure body 248 and the second structure bodies 249a and 249b each have a conical or pyramidal shape with a rounded top surface, and the shapes of the pixel electrode layer 246 and the common electrode layers 247a and 247b which are formed to cover the structure bodies reflect the shape. In the case of such a conical or pyramidal shape, continuity of the pixel electrode layer 246 and the common electrode layers 247a and 247b might be partly broken in the vicinity of the apex of the conical or pyramidal shape (for example, an opening (a hole) might be formed in the film); however, there is no problem as long as the pixel electrode layer 246 and the common electrode layers 247a and 247b can be used for application of voltage.

FIG. 11C illustrates an example in which a pixel electrode layer 230 is formed on a projection of a first structure body 260 having unevenness and common electrode layers 232a and 232b are formed on projections of a second structure body 265 having unevenness. The first structure body 260 having unevenness and the second structure body 265 having unevenness are each an example of a structure body made of a continuous film having a plurality of projections, which is formed by processing an insulating layer so that a surface on the liquid crystal layer side has unevenness. Thus, the pixel electrode layer 230 and the common electrode layers 232a and 232b are formed on the projections of the first structure body 260 and the second structure body 265, respectively.

Figure 12A:
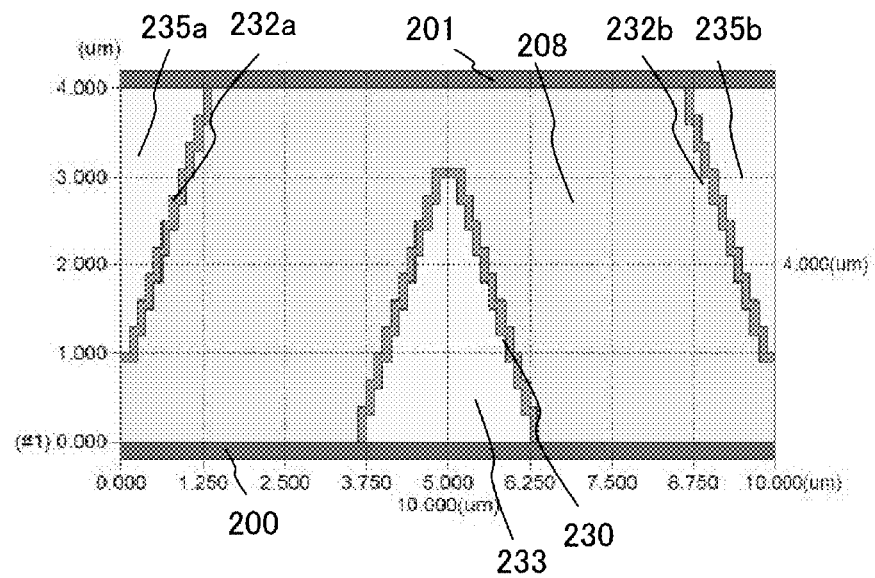
FIGS. 12A and 12B illustrate calculation results of an electric field mode in a liquid crystal display device.
Figure 12B:
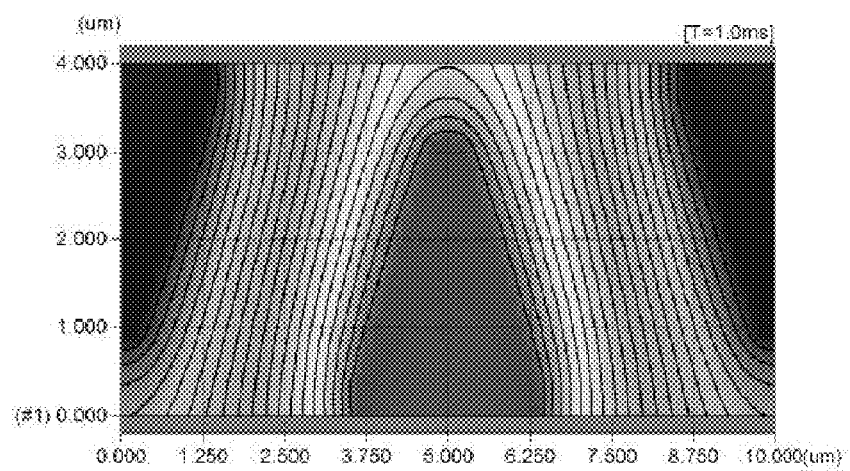
Figure 13A:
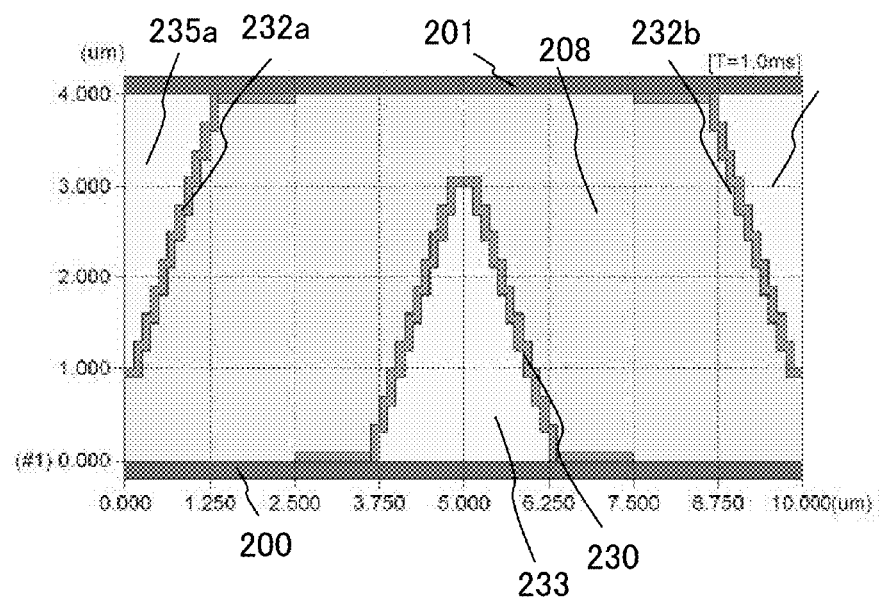
FIGS. 13A and 13B illustrate calculation results of an electric field mode in a liquid crystal display device.
Figure 13B:
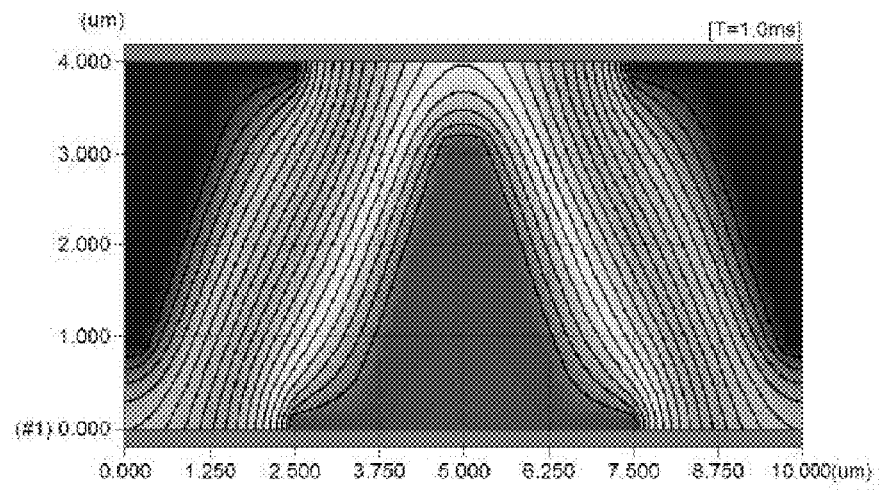

FIG. 12B and FIG. 13B illustrate calculation results of the electric field applied to liquid crystal display devices. The calculation was performed using LCD Master, 2s Bench manufactured by SHINTECH, Inc.

FIG. 12A and FIG. 13A illustrate the structures of the liquid crystal display devices used for calculation. FIG. 12A is an example in which an electrode layer is formed only on the top and side surfaces of a structure body. FIG. 13A is an example in which an electrode layer is formed to cover the top and side surfaces of a structure body and is also formed on part of a substrate around the structure body as in FIGS. 11A and 11B. An insulator with a dielectric constant of 4 was used for the structure bodies (the first structure body 233 and the second structure bodies 235a and 235b), and the width of the cross section of the structure bodies at a position in contact with the substrate was 2.5 μm. The first structure body 233 and the second structure bodies 235a and 235b each have a film thickness (a height) of 3 μm. Note that the film thickness (the height) of each of the first structure body 233 and the second structure bodies 235a and 235b refers to the maximum value from the bottom surface (the first substrate 200 or the second substrate 201).

In FIGS. 12A and 12B and FIGS. 13A and 13B, the pixel electrode layer 230 is formed to cover the top and side surfaces of the first structure body 233, and similarly, the common electrode layers 232a and 232b are formed to cover the top and side surfaces of the second structure bodies 235a and 235b, respectively. The film thickness of each of the pixel electrode layer 230 and the common electrode layers 232a and 232b is 0.1 μm, and the distance between the first structure body 233 and the second structure bodies 235a and 235b is 2.5 μm on the assumption that they are arranged on the same surface. The distance between the first substrate 200 and the second substrate 201, which corresponds to a cell gap (the maximum thickness of the liquid crystal layer), is 4 μm.

FIG. 12B and FIG. 13B illustrate results of calculation performed on the structures of FIG. 12A and FIG. 13A under the condition where the common electrode layer was set to 0 V and the pixel electrode layer was set to 10 V.

In FIG. 12B and FIG. 13B, a solid line represents an equipotential line, which is generated around the pixel electrode layer or the common electrode layer surrounding the rib-shaped structure body.

Since the electric field is generated perpendicular to the equipotential lines, it can be confirmed that, as illustrated in FIG. 12B and FIG. 13B, the electric field is applied in a lateral direction between the pixel electrode layer 230 which is provided to cover the surface of the first structure body 233 and the common electrode layers 232a and 232b which are provided to cover the surfaces of the second structure bodies 235a and 235b.

Accordingly, when a voltage is applied between the pixel electrode layer 230 and the common electrode layers 232a and 232b, an electric field can be widely formed between the pixel electrode layer 230 and the common electrode layers 232a and 232b, and liquid crystal molecules can be controlled using the electric field.

It is thus possible to make liquid crystal molecules respond in the entire liquid crystal layer 208 including the thickness direction, resulting in an improvement in white transmittance. Consequently, the contrast ratio, which is the ratio of white transmittance to black transmittance (light transmittance in black display), can also be increased. In addition, low power consumption can be achieved because an electric field can be effectively applied even to a liquid crystal material (a liquid crystal mixture) exhibiting a blue phase, which has high viscosity.

The structure body (the first structure body and the second structure body) can be formed using an insulator made of an insulating material (an organic material and an inorganic material) or a conductor made of a conductive material (an organic material and an inorganic material). Typically, it is preferable to use a visible light curable resin, an ultraviolet curable resin, or a thermosetting resin. For example, an acrylic resin, an epoxy resin, an amine resin, or the like can be used. Alternatively, the structure body can be formed using a conductive resin or a metal material. Note that the structure body may have a stacked structure of plural thin films.

The material and shape of the first structure body may be similar to those of the second structure body, or the first structure body and the second structure body may be manufactured under different conditions (e.g., different film thicknesses).

There is no particular limitation on the method for forming the structure bodies, and a dry method such as an evaporation method, a sputtering method, or a CVD method or a wet method such as spin coating, dip coating, spray coating, a droplet discharging method (ink jetting), nanoimprinting, or various printing methods (screen printing or offset printing) may be used depending on the material. As needed, an etching method (dry etching or wet etching) may be employed to form a desired pattern.

The liquid crystal layer 208 can be formed by a dispenser method (a dropping method), or an injection method by which a liquid crystal is injected using a capillary phenomenon or the like after the first substrate 200 is attached to the second substrate 201.

A liquid crystal material exhibiting a blue phase is used for the liquid crystal layer 208. The liquid crystal material exhibiting a blue phase has a short response time of 1 msec or less and is capable of high-speed response. Thus, a high-performance liquid crystal display device can be achieved.

For example, a liquid crystal material exhibiting a blue phase, which is capable of high-speed response, can be favorably used for a successive additive color mixing method (a field sequential method) in which light-emitting diodes (LEDs) of RGB or the like are provided in a backlight unit and color display is performed by time division, or a three-dimensional display method using a shutter glasses system in which images for the right eye and images for the left eye are alternately viewed by time division.

The liquid crystal material exhibiting a blue phase includes a liquid crystal and a chiral agent. The chiral agent is used to align the liquid crystal in a helical structure so that the liquid crystal exhibits a blue phase. For example, a liquid crystal material into which a chiral agent is mixed at 5 w % or more may be used for the liquid crystal layer.

As the liquid crystal, a thermotropic liquid crystal, a low molecular liquid crystal, a high molecular liquid crystal, a ferroelectric liquid crystal, an anti-ferroelectric liquid crystal, or the like is used.

For the chiral agent, a material which has a high compatibility with a liquid crystal and has a strong twisting power is used. In addition, either an R-enantiomer or an S-enantiomer is favorable as the material, and a racemic body in which an R-enantiomer and an S-enantiomer are mixed at a ratio of 50:50 is not used.

The above liquid crystal material exhibits a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are observed in a liquid crystal material having a cholesteric phase or a smectic phase with a relatively short helical pitch of 500 nm or less. The alignment of the liquid crystal material has a double twist structure. Having the order of less than or equal to the wavelength of visible light, the liquid crystal material is transparent, and optical modulation action is generated through a change in alignment order by voltage application. A blue phase is optically isotropic and thus has no viewing angle dependence. Consequently, an alignment film is not necessarily formed, which results in an improvement in display image quality and cost reduction.

The blue phase is exhibited only within a narrow temperature range; therefore, in order to extend the temperature range, it is preferable that a photocurable resin and a photopolymerization initiator be added to a liquid crystal material and polymer stabilization treatment be performed. The polymer stabilization treatment is performed in such a manner that a liquid crystal material including a liquid crystal, a chiral agent, a photocurable resin, and a photopolymerization initiator is irradiated with light having a wavelength with which the photocurable resin and the photopolymerization initiator are reacted. Light irradiation in this polymer stabilization treatment may be performed on a liquid crystal material exhibiting either an isotropic phase or a blue phase under the control of temperature.

For example, the polymer stabilization treatment is performed in such a manner that the temperature of a liquid crystal layer is controlled so that the liquid crystal layer exhibiting a blue phase is irradiated with light. Note that the polymer stabilization treatment is not limited to this manner and may be performed in such a manner that light irradiation is performed on a liquid crystal layer exhibiting an isotropic phase at a temperature within +10° C., preferably +5° C. from the phase transition temperature between the blue phase and the isotropic phase. The phase transition temperature between the blue phase and the isotropic phase is a temperature at which the phase changes from the blue phase to the isotropic phase when the temperature is raised, or a temperature at which the phase changes from the isotropic phase to the blue phase when the temperature is lowered. As an example of the polymer stabilization treatment, the following method can be employed: after heating a liquid crystal layer to exhibit an isotropic phase, the temperature is gradually lowered so that the phase changes to a blue phase, and then light irradiation is performed while keeping the temperature at which the blue phase is exhibited. Alternatively, after the phase changes to an isotropic phase by gradually heating a liquid crystal layer, the liquid crystal layer can be irradiated with light at a temperature within +10° C., preferably +5° C. from the phase transition temperature between the blue phase and the isotropic phase (a temperature at which the isotropic phase is exhibited). In the case where an ultraviolet curable resin (a UV curable resin) is used as the photocurable resin included in the liquid crystal material, the liquid crystal layer may be irradiated with ultraviolet rays. Even in the case where a blue phase is not exhibited, if polymer stabilization treatment is performed by irradiation with light at a temperature within +10° C., preferably +5° C. from the phase transition temperature between the blue phase and the isotropic phase (a temperature at which the isotropic phase is exhibited), the response time can be made as short as 1 msec or less to realize high-speed response.

The photocurable resin may be a monofunctional monomer such as acrylate or methacrylate, a polyfunctional monomer such as diacrylate, triacrylate, dimethacrylate, or trimethacrylate, or a mixture of thereof. Further, the photocurable resin may have liquid crystallinity, non-liquid crystallinity, or both of them. A resin which is cured with light having a wavelength with which the photopolymerization initiator to be used is reacted may be selected as the photocurable resin, and an ultraviolet curable resin can be typically used.

The photopolymerization initiator may be a radical polymerization initiator which generates a radical by light irradiation, an acid generator which generates acid by light irradiation, or a base generator which generates a base by light irradiation.

Specifically, a mixture of JC-1041XX (produced by Chisso Corporation) and 4-cyano-4'-pentylbiphenyl can be used as the liquid crystal material. ZLI-4572 (produced by Merck Ltd., Japan) can be used as the chiral agent. As the photocurable resin, 2-ethylhexyl acrylate, RM257 (produced by Merck Ltd., Japan), or trimethylolpropane triacrylate can be used. As the photopolymerization initiator, 2,2-dimethoxy-2-phenylacetophenone can be used.

Although not illustrated in FIG. 1, an optical film or the like, such as a polarizing plate, a retardation plate, or an anti-reflection film, is provided as appropriate. For example, circular polarization may be employed using a polarizing plate and a retardation plate. In addition, a backlight or the like can be used as a light source.

In the case where, in this specification, the liquid crystal display device is of a transmissive type in which display is performed by transmission of light from a light source (or a transflective liquid crystal display device), it is necessary to transmit light at least in a pixel region. Therefore, the first substrate, the second substrate, and other thin films such as an insulating film and a conductive film, which are present in the pixel region through which light is transmitted, all have light-transmitting properties with respect to light in the visible wavelength range.

It is preferable that the pixel electrode layer and the common electrode layer have light-transmitting properties; however, if an opening pattern is provided, a non-light-transmitting material such as a metal film may be used depending on the shape.

The pixel electrode layer and the common electrode layer may be formed using one or more of the following: indium tin oxide (ITO), indium zinc oxide (IZO) in which zinc oxide (ZnO) is mixed into indium oxide, a conductive material in which silicon oxide ($SiO_2$) is mixed into indium oxide, organoindium, organotin, indium oxide including tungsten oxide, indium zinc oxide including tungsten oxide, indium oxide including titanium oxide, and indium tin oxide including titanium oxide; a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy thereof; and a nitride thereof.

As the first substrate 200 and the second substrate 201, a glass substrate made of barium borosilicate glass, aluminoborosilicate glass, or the like, a quartz substrate, a plastic substrate, or the like can be used.

In the above manner, the contrast ratio of the liquid crystal display device including a liquid crystal layer exhibiting a blue phase can be increased.

In addition, high white transmittance can be obtained with lower voltage, resulting in a reduction in the power consumption of the liquid crystal display device.

Embodiment 2

Figure 2:
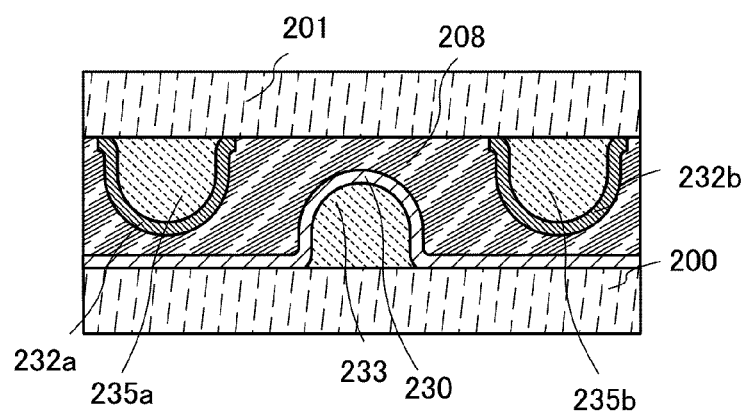
FIG. 2 illustrates a liquid crystal display device.
Figure 3:
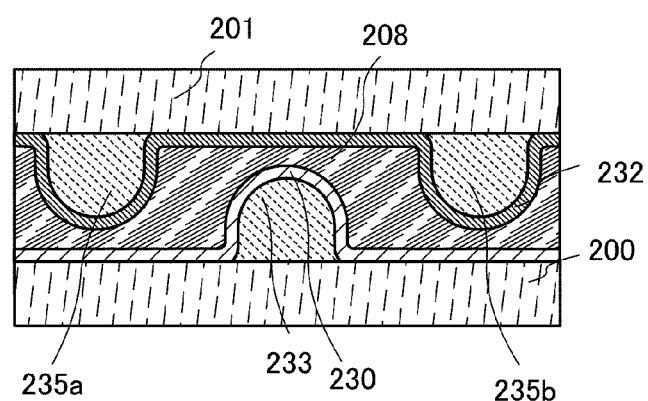
FIG. 3 illustrates a liquid crystal display device.

Liquid crystal display devices which are another embodiment of a structure of the invention disclosed in this specification will be described with reference to FIG. 2 and FIG. 3. FIG. 2 and FIG. 3 are each a cross-sectional view of the liquid crystal display device including a pixel electrode layer and a common electrode layer which have a different structure from those of the liquid crystal display device shown in Embodiment 1. Note that components in common with those in Embodiment 1 can be formed using a similar material and manufacturing method, and detailed description of like portions or portions having a similar function will be omitted.

In the case where a pixel electrode layer and a common electrode layer are formed on a rib-shaped first structure body or second structure body, the pixel electrode layer and the common electrode layer are provided at least on the top and side surfaces of the rib-shaped first structure body or second structure body. At least one of the pixel electrode layer and the common electrode layer may also be formed in a flat region in a pixel other than the surfaces of the first structure body or second structure body. This embodiment shows an example in which the pixel electrode layer or/and the common electrode layer is/are formed in a flat region in a pixel other than the surfaces of the first structure body or second structure body.

FIG. 2 and FIG. 3 illustrate a liquid crystal display device including the first substrate 200 and the second substrate 201 which face each other and between which the liquid crystal layer 208 using a liquid crystal material exhibiting a blue phase is interposed. The first structure body 233 and the pixel electrode layer 230 are provided between the first substrate 200 and the liquid crystal layer 208, and the second structure bodies 235a and 235b and the common electrode layers 232a and 232b are provided between the second substrate 201 and the liquid crystal layer 208. The first structure body 233 projects into the liquid crystal layer 208 from the surface of the first substrate 200 on the liquid crystal layer 208 side, and the second structure bodies 235a and 235b project into the liquid crystal layer 208 from the surface of the second substrate 201 on the liquid crystal layer 208 side.

In the pixel of FIG. 2, the pixel electrode layer 230 is formed to cover the top and side surfaces of the first structure body 233 which projects into the liquid crystal layer 208 from the surface of the first substrate 200 on the liquid crystal layer 208 side (the surface facing the liquid crystal layer 208), and to cover the top surface of the first substrate 200. The common electrode layers 232a and 232b are formed to cover the top and side surfaces of the second structure bodies 235a and 235b which project into the liquid crystal layer 208 from the surface of the second substrate 201 on the liquid crystal layer 208 side.

As illustrated in FIG. 2, the pixel electrode layer 230 is not necessarily formed selectively on the top and side surfaces of the first structure body 233, but can be formed as a continuous conductive film covering one pixel region.

Even in the case where the pixel electrode layer 230 is formed as a continuous film in the region other than the first structure body 233, it is part of the conductive film serving as the pixel electrode layer 230 provided on the surface of the first structure body 233 that projects into the liquid crystal layer 208. Consequently, as illustrated in the cross-sectional view of FIG. 2, the first substrate 200 and the second substrate 201 can be arranged to face each other so that the projections formed on the surfaces of the pixel electrode layer 230 and the common electrode layers 232a and 232b, which cover the first structure body 233 and the second structure bodies 235a and 235b, engage with each other.

Similarly, the common electrode layers 232a and 232b are not necessarily formed selectively on the top and side surfaces of the second structure bodies 235a and 235b, but can be formed as a continuous conductive film with a plate shape. The common electrode layer, through which a common voltage is applied to all pixels, can be formed as a plate-like continuous conductive film covering a pixel region including a plurality of pixels.

FIG. 3 is an example in which each of the pixel electrode layer 230 and the common electrode layer 232 is formed as a plate-like continuous conductive film which does not include an opening pattern at least in one pixel. Although the pixel electrode layer 230 and the common electrode layer 232 are each formed as a plate-like conductive film, they have projections on their surfaces because they are formed to cover the first structure body 233 or the second structure bodies 235a and 235b, and the projections engage with each other when the substrates are arranged to face each other.

Alternatively, the common electrode layer can be formed as a plate-like continuous conductive film and the pixel electrode layer can be formed selectively only on the top and side surfaces of the first structure body.

The distance between the pixel electrode layer 230 and the common electrode layer 232a or the common electrode layer 232b, which are adjacent to each other with the liquid crystal layer 208 interposed therebetween, is a distance at which a liquid crystal in the liquid crystal layer 208 between the electrode layers responds to a predetermined voltage which is applied to the pixel electrode layer 230 and the common electrode layers 232a and 232b. The minimum distance between the side surfaces of the pixel electrode layer 230 and the common electrode layer 232a or the common electrode layer 232b, which are adjacent to each other with the liquid crystal layer 208 interposed therebetween, is longer than or equal to 0.5 μm and shorter than or equal to 30 μm, and preferably longer than or equal to 1 μm and shorter than or equal to 10 μm. The voltage applied is controlled depending on the distance as appropriate.

Note that in this specification, the distance between the adjacent pixel electrode layer and common electrode layer refers to the minimum distance between the projections of the pixel electrode layer and the common electrode layer (the side surfaces in the cross-sectional views of FIG. 2 and FIG. 3), which project into the liquid crystal layer. It is possible to make liquid crystals respond to an electric field formed between the side surfaces of the adjacent pixel electrode layer and common electrode layer.

Thus, the minimum distance between the side surfaces of the first structure body 233 and the second structure body 235a or 235b, which are adjacent to each other with the liquid crystal layer 208 interposed therebetween, is longer than or equal to 0.5 μm and shorter than or equal to 30 μm, and preferably longer than or equal to 1 μm and shorter than or equal to 10 μm. The voltage applied to the pixel electrode layer 230 and the common electrode layers 232a and 232b is controlled depending on the distance as appropriate.

As described above, in the pixel, the pixel electrode layer or/and the common electrode layer can be formed as a plate-like continuous conductive film. When a plate-like continuous conductive film is used for an electrode layer, the step of finely etching the electrode layer can be omitted.

In the case of this embodiment, the film thicknesses and shapes of the first structure body 233 and the second structure bodies 235a and 235b, the film thicknesses of the pixel electrode layer 230, the common electrode layers 232 (232a and 232b), and the liquid crystal layer 208, and the like are controlled so that the pixel electrode layer 230 is not in contact with the common electrode layers 232 (232a and 232b).

Figure 14A:
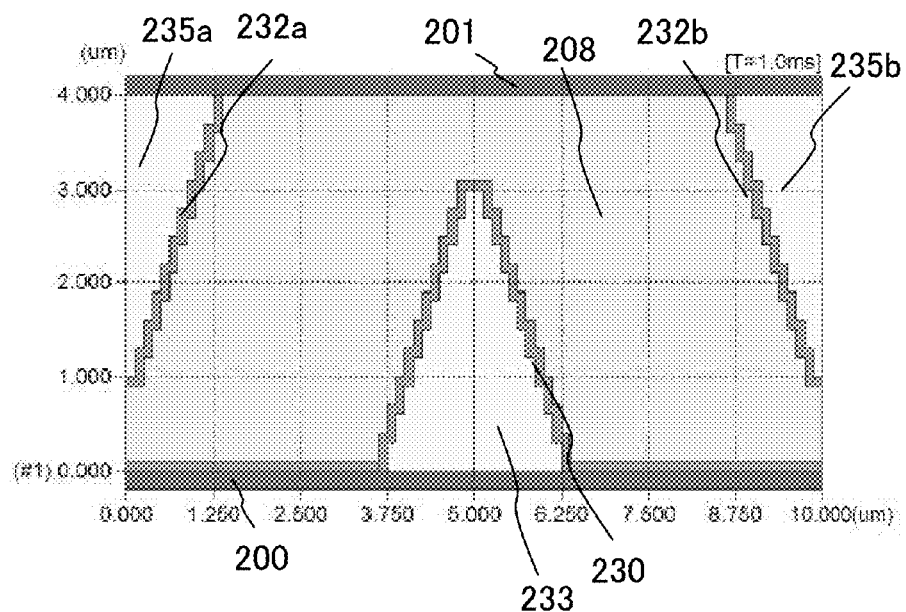
FIGS. 14A and 14B illustrate calculation results of an electric field mode in a liquid crystal display device.
Figure 14B:
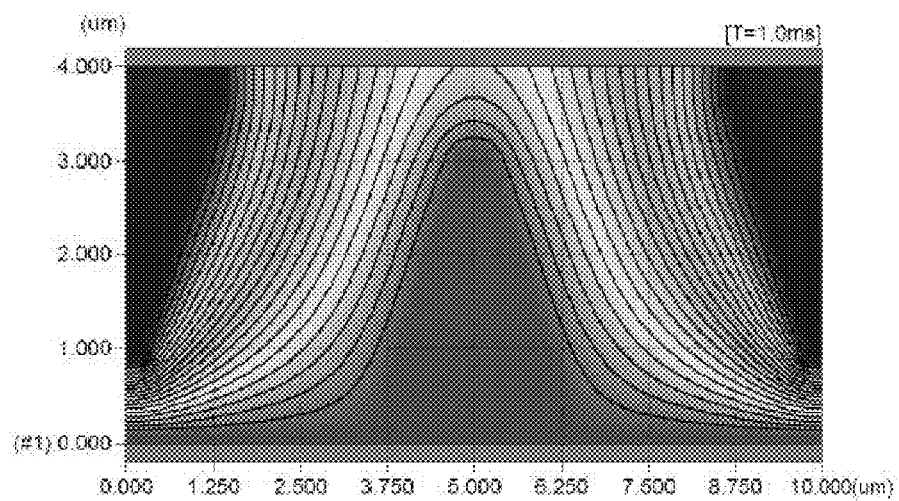
Figure 15A:
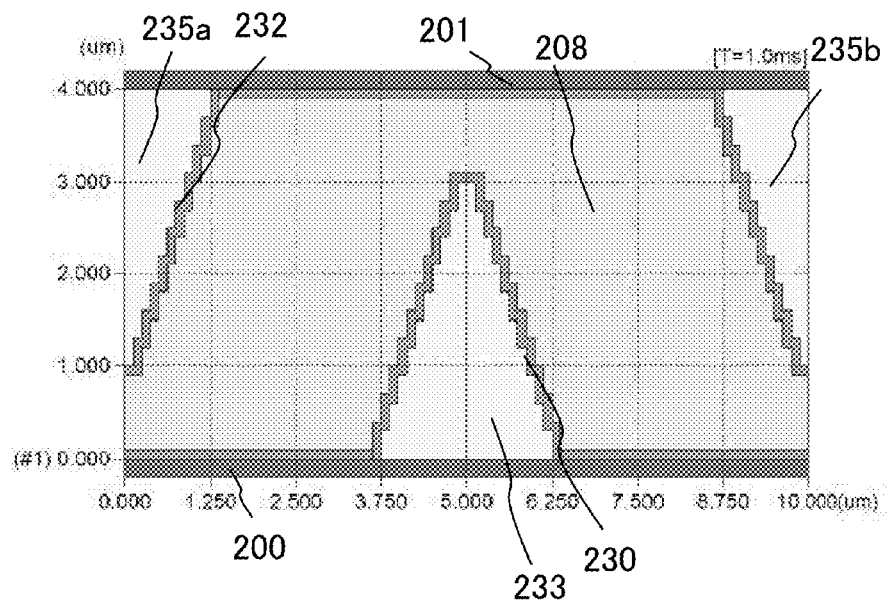
FIGS. 15A and 15B illustrate calculation results of an electric field mode in a liquid crystal display device.
Figure 15B:
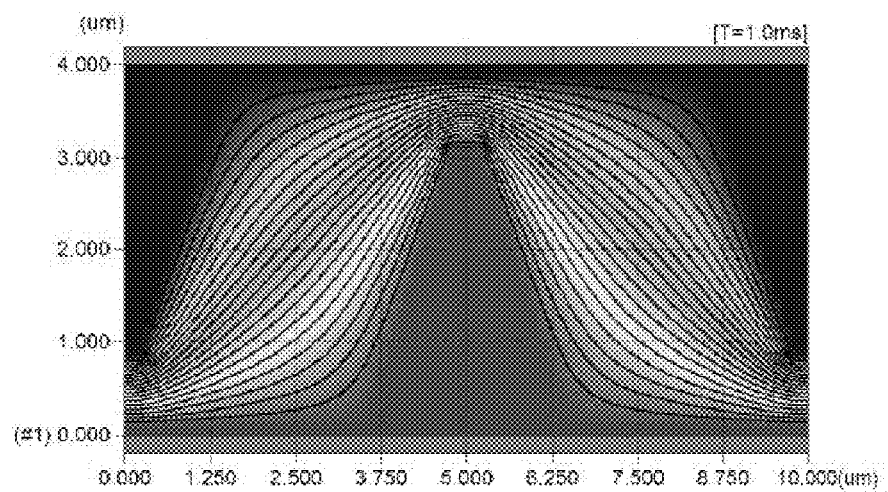

FIG. 14B and FIG. 15B illustrate calculation results of the electric field applied to liquid crystal display devices. The calculation was performed using LCD Master, 2s Bench manufactured by SHINTECH, Inc.

FIG. 14A and FIG. 15A illustrate the structures of the liquid crystal display devices used for calculation. FIG. 14A is an example in which the pixel electrode layer 230 is formed as a plate-like continuous conductive film and the common electrode layers 232a and 232b are formed selectively only on the top and side surfaces of the second structure bodies 235a and 235b as in FIG. 2. FIG. 15A is an example in which the pixel electrode layer 230 and the common electrode layer 232 are each formed as a plate-like continuous conductive film as in FIG. 3. An insulator with a dielectric constant of 4 was used for the first structure body 233 and the second structure bodies 235a and 235b, and the width of the cross section of the structure bodies was 2.5 μm at a position in contact with the substrate. The first structure body 233 and the second structure bodies 235a and 235b each have a film thickness (a height) of 3 μm. Note that the film thickness (the height) of each of the first structure body 233 and the second structure bodies 235a and 235b refers to the maximum value from the bottom surface (the first substrate 200 or the second substrate 201).

In FIGS. 14A and 14B and FIGS. 15A and 15B, the film thickness of each of the pixel electrode layer 230 and the common electrode layers 232 (232a and 232b) is 0.1 μm, and the distance between the first structure body 233 and the second structure bodies 235a and 235b is 2.5 μm on the assumption that they are arranged on the same surface. The distance between the first substrate 200 and the second substrate 201, which corresponds to a cell gap (the maximum thickness of the liquid crystal layer), is 4 μm.

FIG. 14B and FIG. 15B illustrate results of calculation performed on the structures of FIG. 14A and FIG. 15A under the condition where the common electrode layer was set to 0 V and the pixel electrode layer was set to 10 V.

In FIG. 14B and FIG. 15B, a solid line represents an equipotential line, which is generated around the pixel electrode layer or the common electrode layer surrounding the rib-shaped structure body.

Since the electric field is generated perpendicular to the equipotential lines, it can be confirmed that, as illustrated in FIG. 14B and FIG. 14B, the electric field is applied in a lateral direction between the pixel electrode layer 230 which is provided to cover the surface of the first structure body 233 and the common electrode layers 232 (232a and 232b) which are provided to cover the surfaces of the second structure bodies 235a and 235b.

Accordingly, when a voltage is applied between the pixel electrode layer 230 and the common electrode layers 232 (232a and 232b), a strong electric field can be widely formed between the pixel electrode layer 230 and the common electrode layers 232 (232a and 232b), and liquid crystal molecules can be controlled using the electric field.

It is thus possible to make liquid crystal molecules respond in the entire liquid crystal layer 208 including the thickness direction, resulting in an improvement in white transmittance. Consequently, the contrast ratio, which is the ratio of white transmittance to black transmittance (light transmittance in black display), can also be increased. In addition, low power consumption can be achieved because an electric field can be effectively applied even to a liquid crystal material (a liquid crystal mixture) exhibiting a blue phase, which has high viscosity.

In the above manner, the contrast ratio of the liquid crystal display device including a liquid crystal layer exhibiting a blue phase can be increased.

In addition, high white transmittance can be obtained with lower voltage, resulting in a reduction in the power consumption of the liquid crystal display device.

Embodiment 3

An example of an active matrix liquid crystal display device employing the invention disclosed in this specification will be described with reference to FIGS. 4A and 4B.

Figure 4A:
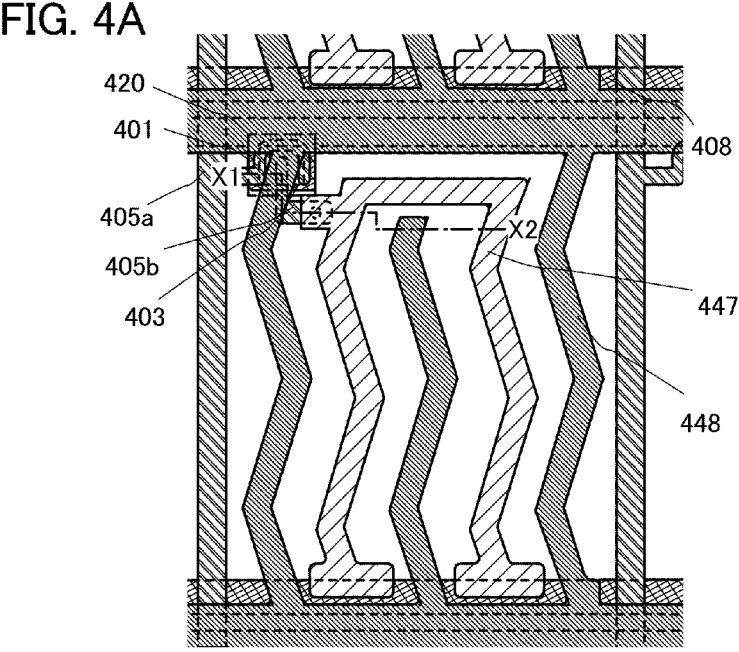
FIGS. 4A and 4B illustrate a liquid crystal display device.

FIG. 4A is a top view of a liquid crystal display device and illustrates one pixel. FIG. 4B is a cross-sectional view taken along line X1-X2 of FIG. 4A.

In FIG. 4A, a plurality of source wiring layers (including a source electrode layer 405a) is provided in parallel to each other (extends in the vertical direction in the drawing) and apart from each other. A plurality of gate wiring layers (including a gate electrode layer 401) extends in a direction generally perpendicular to the source wiring layers (the horizontal direction in the drawing) and is provided apart from each other. Capacitor wiring layers 408 are adjacent to the plurality of gate wiring layers and extend in a direction generally parallel to the gate wiring layers, namely, a direction generally perpendicular to the source wiring layers (the horizontal direction in the drawing). A generally rectangular space is surrounded by the source wiring layers, the capacitor wiring layers 408, and the gate wiring layers. In this space, a pixel electrode layer and a common electrode layer of the liquid crystal display device are provided with a liquid crystal layer 444 interposed therebetween. A transistor 420 for driving the pixel electrode layer is provided at the upper left corner of the drawing. A plurality of pixel electrode layers and a plurality of transistors are arranged in matrix.

Figure 4B:
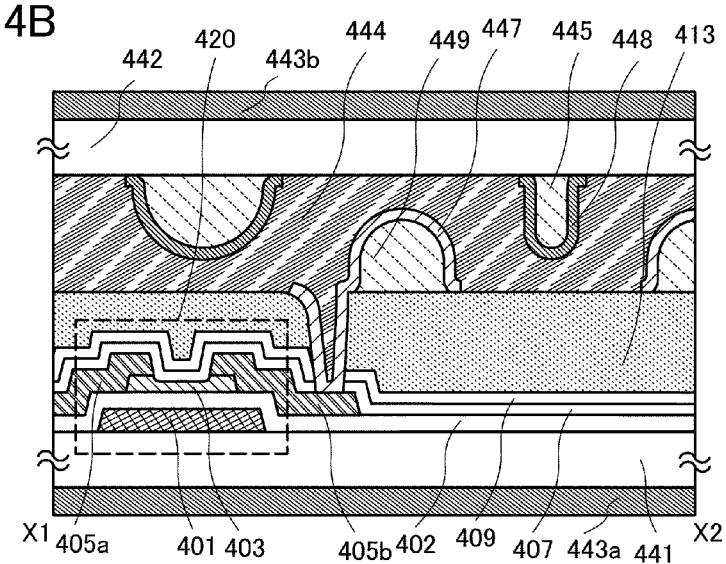

In the liquid crystal display device illustrated in FIGS. 4A and 4B, a first electrode layer 447 which is electrically connected to the transistor 420 functions as a pixel electrode layer, and a second electrode layer 448 functions as a common electrode layer. Note that a capacitor is formed by the first electrode layer 447 and the capacitor wiring layer 408. Although the common electrode layer can operate in a floating state (an electrically isolated state), the potential thereof may be set to a fixed potential, preferably to a potential around a common potential (an intermediate potential of an image signal transmitted as data) in such a level as not to generate flickers.

The first electrode layer 447 functioning as a pixel electrode layer and the second electrode layer 448 functioning as a common electrode layer project into the liquid crystal layer 444 exhibiting a blue phase, and the adjacent first electrode layer 447 and second electrode layer 448 are arranged to engage with each other at a distance with the liquid crystal layer 444 interposed therebetween.

The distance between the first electrode layer 447 and the second electrode layer 448, which are adjacent to each other with the liquid crystal layer 444 interposed therebetween, is a distance at which a liquid crystal in the liquid crystal layer 444 between the first electrode layer 447 and the second electrode layer 448 responds to a predetermined voltage which is applied to the first electrode layer 447 and the second electrode layer 448. The voltage applied is controlled depending on the distance as appropriate.

The positions of the first electrode layer 447 and the second electrode layer 448 in the liquid crystal layer 444 can be controlled by providing structure bodies under the first electrode layer 447 and the second electrode layer 448.

The first electrode layer 447 is formed to cover the top and side surfaces of a first structure body 449 which is provided to project into the liquid crystal layer 444 from a surface of an interlayer film 413 on a first substrate 441 (also referred to as an element substrate) on the liquid crystal layer 444 side. The second electrode layer 448 is formed to cover the top and side surfaces of a second structure body 445 which is provided to project into the liquid crystal layer 444 from a surface of the second substrate 442 on the liquid crystal layer 444 side.

In addition, in the cross-sectional view of FIG. 4B, the first structure body 449 and the first electrode layer 447, and the second structure body 445 and the second electrode layer 448 are alternately provided without overlapping with each other.

In the in-plane direction, as illustrated in the top view of FIG. 4A, the rib-shaped first structure body 449 and the rib-shaped second structure body 445, which have substantially the same shapes as the first electrode layer 447 and the second electrode layer 448 respectively, have an opening pattern and include a bent portion or a branching comb-like shape. The first structure body 449 and the second structure body 445 are formed so as not to overlap with each other when the first substrate 441 faces the second substrate 442.

In the thickness (film thickness) direction, as illustrated in the cross-sectional view of FIG. 4B, the first structure body 449 and the second structure body 445 are fixed with a sealant in such a manner that, when the first substrate 441 and the second substrate 442 are arranged so that the surface provided with the first structure body 449 faces the surface provided with the second structure body 445, the rib-shaped projections engage with each other with the liquid crystal layer 444 interposed therebetween.

In this embodiment, the shapes of the first electrode layer 447 and second electrode layer 448, which reflect the shapes of the first structure body 449 and second structure body 445 formed under the electrode layers, also have an opening pattern and include a bent portion or a branching comb-like shape.

The first structure body 449 and the second structure body 445 have a dome shape with a rounded top and an almost semicircular cross section. When the structure body has such a curved surface, the first electrode layer 447 or the second electrode layer 448 can be stacked thereon with good coverage to have a favorable shape.

Since the first electrode layer 447, the first structure body 449, the second electrode layer 448, and the second structure body 445 each have an opening pattern, they are illustrated as divided plural electrode layers or structure bodies in the cross-sectional view of FIG. 4B.

The first electrode layer 447 is formed to cover the top and side surfaces of the rib-shaped first structure body 449 provided over the first substrate 441, and the second electrode layer 448 is formed to cover the top and side surfaces of the rib-shaped second structure body 445 provided over the second substrate 442. As a result, the area where the first electrode layer 447 and the second electrode layer 448 are formed can be increased in the thickness direction of the liquid crystal layer 444 (three-dimensionally). Further, the first substrate 441 and the second substrate 442 are arranged to face each other so that the projections formed on the surfaces of the first electrode layer 447 and the second electrode layer 448, which cover the first structure body 449 and the second structure body 445, engage with each other.

Accordingly, when a voltage is applied between the first electrode layer 447 and the second electrode layer 448, an electric field can be widely formed between the first electrode layer 447 and the second electrode layer 448, and liquid crystal molecules can be controlled using the electric field.

Note that as in Embodiment 2, the first electrode layer 447 or/and the second electrode layer 448 can be formed as a plate-like continuous conductive film.

It is thus possible to make liquid crystal molecules respond in the entire liquid crystal layer including the thickness direction, resulting in an improvement in white transmittance. Consequently, the contrast ratio, which is the ratio of white transmittance to black transmittance (light transmittance in black display), can also be increased.

The first structure body 449 and the second structure body 445 can be formed using a material and a process which are similar to those of the first structure body 233 and the second structure bodies 235*a* and 235*b* shown in Embodiment 1.

It is preferable that the first structure body 449 on which the first electrode layer 447 is formed and the second structure body 445 on which the second electrode layer 448 is formed each have a tapered shape with end portions having curvatures as illustrated in FIG. 4B, because coverage with the first electrode layer 447 and the second electrode layer 448 is improved. This embodiment shows an example in which the first electrode layer 447 is in contact with a drain electrode layer 405*b* of the transistor 420 and continuously formed on the first structure body 449; however, the first electrode layer 447 may be formed on an electrode layer which is formed in contact with the drain electrode layer 405*b*.

In the case where an interlayer film is formed to cover a transistor and a structure body is formed on the interlayer film, after the structure body is formed by an etching process, a contact hole for connection of the transistor may be opened in the interlayer film. Note that FIGS. 4A and 4B illustrate an example in which a contact hole is formed in an insulating film which is to be, an interlayer film and then the insulating film is processed by etching so that the structure bodies are formed.

The transistor 420 is an inverted staggered thin film transistor formed over the first substrate 441 which is a substrate having an insulating surface, and includes the gate electrode layer 401, a gate insulating layer 402, a semiconductor layer 403, the source electrode layer 405a, and the drain electrode layer 405b.

An insulating film 407 which is in contact with the semiconductor layer 403, and an insulating film 409 are provided to cover the transistor 420. The interlayer film 413 is stacked over the insulating film 409.

There is no particular limitation on the method for forming the interlayer film 413, and the following method can be employed depending on the material: spin coating, dip coating, spray coating, droplet discharging (such as ink jetting, screen printing, or offset printing), roll coating, curtain coating, knife coating, or the like.

The first substrate 441 and the second substrate 442 which is a counter substrate are fixed to each other with a sealant with the liquid crystal layer 444 interposed therebetween. The liquid crystal layer 444 can be formed by a dispenser method (a dropping method), or an injection method by which a liquid crystal is injected using a capillary phenomenon or the like after the first substrate 441 is attached to the second substrate 442.

A liquid crystal material exhibiting a blue phase can be used for the liquid crystal layer 444. The liquid crystal layer 444 is formed using a liquid crystal material including a liquid crystal, a chiral agent, a photocurable resin, and a photopolymerization initiator.

As the sealant, it is preferable to use a visible light curable resin, an ultraviolet curable resin, or a thermosetting resin. Typically, an acrylic resin, an epoxy resin, an amine resin, or the like can be used. Further, a photopolymerization initiator (typically, an ultraviolet light polymerization initiator), a thermosetting agent, a filler, or a coupling agent may be included in the sealant.

After the space between the first substrate 441 and the second substrate 442 is filled with the liquid crystal material, polymer stabilization treatment is performed by light irradiation, whereby the liquid crystal layer 444 is formed. The light has a wavelength with which the photocurable resin and the photopolymerization initiator included in the liquid crystal layer are reacted. By this polymer stabilization treatment with light irradiation, the temperature range in which the liquid crystal layer 444 exhibits a blue phase can be extended.

In the case where a photocurable resin such as an ultraviolet curable resin is used as the sealant and the liquid crystal layer is formed by a dropping method, for example, the sealant may be cured by the light irradiation step of the polymer stabilization treatment.

In this embodiment, a polarizing plate 443a is provided on the outer side of the first substrate 441 (on the side opposite to the liquid crystal layer 444), and a polarizing plate 443b is provided on the outer side of the second substrate 442 (on the side opposite to the liquid crystal layer 444). In addition to the polarizing plates, an optical film such as a retardation plate or an anti-reflection film may be provided. For example, circular polarization may be employed using a polarizing plate and a retardation plate. Through the above steps, the liquid crystal display device can be completed.

In the case of manufacturing a plurality of liquid crystal display devices with the use of a large-sized substrate (a so-called multiple panel method), a division step can be performed before the polymer stabilization treatment or before provision of the polarizing plates. In consideration of the influence of the division step on the liquid crystal layer (such as alignment disorder due to force applied in the division step), it is preferable that the division step be performed after the first substrate is attached to the second substrate and before the polymer stabilization treatment is performed.

Although not illustrated, a backlight, a sidelight, or the like may be used as a light source. Light from the light source is emitted from the first substrate 441 side which is an element substrate so as to pass through the second substrate 442 on the viewing side.

The first electrode layer 447 and the second electrode layer 448 can be made of a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added.

The first electrode layer 447 and the second electrode layer 448 can also be made of one or a plurality of materials selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and a nitride thereof.

Alternatively, the first electrode layer 447 and the second electrode layer 448 can be made of a conductive composition including a conductive high molecule (also referred to as a conductive polymer). The pixel electrode formed using the conductive composition preferably has a sheet resistance of less than or equal to 10000 ohms per square and a transmittance of greater than or equal to 70% at a wavelength of 550 nm. Further, the resistivity of the conductive high molecule included in the conductive composition is preferably less than or equal to 0.1 Ω·cm.

As the conductive high molecule, a so-called π-electron conjugated conductive polymer can be used. For example, polyaniline or a derivative thereof, polypyrrole or a derivative thereof, polythiophene or a derivative thereof, or a copolymer of two or more kinds of them can be given.

An insulating film serving as a base film may be provided between the first substrate 441 and the gate electrode layer 401. The base film has a function of preventing diffusion of an impurity element from the first substrate 441, and can be formed to have a single-layer structure or a multi-layer structure using one or more of a silicon nitride film, a silicon oxide film, a silicon nitride oxide film, and a silicon oxynitride film. The gate electrode layer 401 can be formed to have a single-layer structure or a multi-layer structure using a metal material such as molybdenum, titanium, chromium, tantalum, tungsten, aluminum, copper, neodymium, or scandium, or an alloy material containing any of these as a main component. By using a light-blocking conductive film as the gate electrode layer 401, light from a backlight (light emitted through the first substrate 441) can be prevented from entering the semiconductor layer 403.

As a two-layer structure of the gate electrode layer 401, it is preferable to employ a structure in which a molybdenum layer is stacked over an aluminum layer, a structure in which a molybdenum layer is stacked over a copper layer, a structure in which a titanium nitride layer or a tantalum nitride layer is stacked over a copper layer, or a structure in which a titanium nitride layer and a molybdenum layer are stacked. As a three-layer structure, it is preferable to employ a structure in which a tungsten layer or a tungsten nitride layer, an alloy layer of aluminum and silicon or an alloy layer of aluminum and titanium, and a titanium nitride layer or a titanium layer are stacked.

The gate insulating layer 402 can be formed to have a single-layer structure or a multi-layer structure using a silicon oxide layer, a silicon nitride layer, a silicon oxynitride layer, or a silicon nitride oxide layer by a plasma CVD method, a sputtering method, or the like. Alternatively, the gate insulating layer 402 can be formed using a silicon oxide layer by a CVD method using an organosilane gas. As the organosilane gas, any of the following compounds containing silicon can be used: tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane ($SiH(OC_2H_5)_3$), trisdimethylaminosilane ($SiH(N(CH_3)_2)_3$), and the like.

In the process of forming the semiconductor layer and the wiring layer, an etching step is performed to process a thin film into a desired shape. Dry etching or wet etching can be used for the etching step.

As an etching apparatus used for dry etching, an etching apparatus using a reactive ion etching method (an RIE method), or a dry etching apparatus using a high-density plasma source such as electron cyclotron resonance (ECR) or inductively coupled plasma (ICP) can be used. As a dry etching apparatus with which uniform discharge can be easily obtained over a large area as compared to an ICP etching apparatus, there is an enhanced capacitively coupled plasma (ECCP) mode etching apparatus in which an upper electrode is grounded, a high-frequency power source of 13.56 MHz is connected to a lower electrode, and further a low-frequency power source of 3.2 MHz is connected to the lower electrode. This ECCP mode etching apparatus can be employed even when a substrate having a size exceeding 3 meters of the tenth generation is used as the substrate, for example.

In order to etch the film into a desired shape by dry etching, the etching conditions (such as the amount of electric power applied to a coil-shaped electrode, the amount of electric power applied to an electrode on a substrate side, and the temperature of the electrode on the substrate side) are adjusted as appropriate.

The etching conditions (such as an etchant, etching time, and temperature) are adjusted as appropriate depending on the material so that the film can be etched into a desired shape by wet etching.

As a material of the source electrode layer 405a and the drain electrode layer 405b, an element selected from Al, Cr, Ta, Ti, Mo, and W, an alloy containing any of these elements as a component, an alloy film containing any of these elements in combination, and the like can be given. In the case where heat treatment is performed, it is preferable that the conductive film have heat resistance enough to withstand the heat treatment. For example, since the use of Al alone brings disadvantages such as low heat resistance and a tendency to corrosion, aluminum is used in combination with a conductive material having heat resistance. As the conductive material having heat resistance which is combined with Al, an element selected from titanium (Ti), tantalum (Ta), tungsten (W), molybdenum (Mo), chromium (Cr), neodymium (Nd), and scandium (Sc), an alloy containing any of these elements as a component, an alloy film containing any of these elements in combination, or a nitride containing any of these elements as a component is used.

Films to be the gate insulating layer 402, the semiconductor layer 403, and the source electrode layer 405a and the drain electrode layer 405b may be successively formed without exposure to air. By successive formation without exposure to air, each interface between the stacked layers can be formed without being contaminated by atmospheric components or contaminant impurity elements in air, which makes it possible to reduce variation in the characteristics of the transistor.

Note that the semiconductor layer 403 is etched only partly so as to have a groove (a depressed portion).

As the insulating film 407 and the insulating film 409 which cover the transistor 420, an inorganic insulating film or an organic insulating film formed by a dry method or a wet method can be used. For example, it is possible to use a silicon nitride film, a silicon oxide film, a silicon oxynitride film, an aluminum oxide film, or a tantalum oxide film, which is formed by a CVD method, a sputtering method, or the like. In addition, an organic material such as polyimide, acrylic, benzocyclobutene, polyamide, or epoxy can be used. Other than such organic materials, it is also possible to use a low-dielectric constant material (a low-k material), a siloxane-based resin, phosphosilicate glass (PSG), borophosphosilicate glass (BPSG), or the like. A gallium oxide film can also be used as the insulating film 407.

Note that the siloxane-based resin is a resin including a Si—O—Si bond, which is formed using a siloxane-based material as a starting material. The siloxane-based resin may include, as a substituent, an organic group (e.g., an alkyl group or an aryl group) or a fluoro group. The organic group may include a fluoro group. A siloxane-based resin is applied by a coating method and baked; then, the insulating film 407 can be formed.

Alternatively, the insulating film 407 and the insulating film 409 may be formed by stacking plural insulating films formed using any of these materials. For example, the insulating film 407 and the insulating film 409 may each have a structure in which an organic resin film is stacked over an inorganic insulating film.

If a resist mask is formed using a multi-tone mask to have a plurality of regions with different thicknesses (typically, two kinds of thicknesses), the number of resist masks can be reduced, resulting in a simplified process and lower cost.

In the above manner, the contrast ratio of the liquid crystal display device including a liquid crystal layer exhibiting a blue phase can be increased.

In addition, high white transmittance can be obtained with lower voltage, resulting in a reduction in the power consumption of the liquid crystal display device.

Embodiment 4

The liquid crystal display device shown in any of Embodiments 1 to 3 can be provided with a light-blocking layer (a black matrix). Note that components in common with those in Embodiments 1 to 3 can be formed using a similar material and manufacturing method, and detailed description of like portions or portions having a similar function will be omitted.

The light-blocking layer can be provided on the inner side of a pair of substrates bonded to each other with a liquid crystal layer interposed therebetween (on the liquid crystal layer side), or on the outer side of the substrates (on the side opposite to the liquid crystal layer).

In the case where a light-blocking layer is provided on the inner side of a pair of substrates in a liquid crystal display device, the light-blocking layer can be formed on an element substrate side provided with a pixel electrode layer, or on a counter substrate side provided with a common electrode layer. The light-blocking layer can be additionally provided; alternatively, in the case of an active matrix liquid crystal display device shown in Embodiment 3, the light-blocking layer can be formed as an interlayer film provided on the element substrate. In the liquid crystal display device of Embodiment 3 illustrated in FIGS. 4A and 4B, for example, a light-blocking layer can be formed as part of the interlayer film 413.

The light-blocking layer is made of a light-blocking material which reflects or absorbs light. For example, a black organic resin can be used, which can be formed by mixing a black resin of a pigment material, carbon black, titanium black, or the like into a resin material such as photosensitive or non-photosensitive polyimide. Alternatively, a light-blocking metal film can be used, which is made of chromium, molybdenum, nickel, titanium, cobalt, copper, tungsten, or aluminum, for example.

There is no particular limitation on the method for forming the light-blocking layer, and a dry method such as an evaporation method, a sputtering method, or a CVD method or a wet method such as spin coating, dip coating, spray coating, a droplet discharging method (e.g., ink jetting, screen printing, or offset printing), may be used depending on the material. As needed, an etching method (dry etching or wet etching) may be employed to form a desired pattern.

In the case where the light-blocking layer is formed as part of the interlayer film 413, it is preferably made of a black organic resin.

In the case where the light-blocking layer is formed directly on the element substrate side as part of the interlayer film, the problem of misalignment between the light-blocking layer and a pixel region does not occur, whereby the formation region can be controlled more precisely even when a pixel has a minute pattern.

When the liquid crystal display device has a structure in which the light-blocking layer is formed over the element substrate, light emitted from the counter substrate side is not absorbed or blocked by the light-blocking layer in light irradiation for polymer stabilization treatment; thus, the entire liquid crystal layer can be uniformly irradiated with light. Therefore, alignment disorder of liquid crystals due to nonuniform photopolymerization, display unevenness due to the alignment disorder, and the like can be prevented.

In the liquid crystal display device, the light-blocking layer can be provided in an area overlapping with a semiconductor layer of a transistor or a contact hole, or between pixels.

The light-blocking layer provided in this manner can block light entering the semiconductor layer of the transistor; consequently, electric characteristics of the transistor can be prevented from varying due to incident light and can be stabilized. Further, the light-blocking layer prevents light leakage to an adjacent pixel, and reduces display unevenness caused by light leakage or the like due to an alignment defect of liquid crystals which occurs easily over a contact hole. As a result, high definition and high reliability of the liquid crystal display device can be achieved.

This embodiment can be implemented in appropriate combination with the structures described in the other embodiments.

Embodiment 5

This embodiment shows an example of a liquid crystal display device performing color display. The liquid crystal display device shown in any of Embodiments 1 to 4 can be provided with a color filter to perform color display. Note that components in common with those in Embodiments 1 to 4 can be formed using a similar material and manufacturing method, and detailed description of like portions or portions having a similar function will be omitted.

In the case where a liquid crystal display device performs full-color display, a color filter can be made of materials which exhibit red (R), green (G), and blue (B). In the case of mono-color display other than monochrome display, a color filter can be made of a material which exhibits at least one color.

Specifically, the liquid crystal display device is provided with a coloring layer serving as a color filter layer. The color filter layer can be formed on the inner side of a pair of substrates bonded to each other with a liquid crystal layer interposed therebetween (on the liquid crystal layer side), or on the outer side of the substrates (on the side opposite to the liquid crystal layer).

First, description is made of the case where a color filter layer is provided on the inner side of a pair of substrates in a liquid crystal display device. The color filter layer can be formed on an element substrate side provided with a pixel electrode layer, or on a counter substrate side provided with a common electrode layer. The color filter layer can be additionally provided; alternatively, in the case of an active matrix liquid crystal display device shown in Embodiment 3, the color filter layer can be formed as an interlayer film provided on an element substrate. In the case of the liquid crystal display device of Embodiment 3 illustrated in FIGS. 4A and 4B, for example, a chromatic-color light-transmitting resin layer serving as a color filter layer can be used as the interlayer film 413.

In the case where the interlayer film is formed directly on the element substrate side as the color filter layer, the problem of misalignment between the color filter layer and a pixel region does not occur, whereby the formation region can be controlled more precisely even when a pixel has a minute pattern. In addition, the same insulating layer serves as the interlayer film and the color filter layer, which brings advantages of process simplification and cost reduction.

Furthermore, when the liquid crystal display device has a structure in which the color filter layer is formed over the element substrate, light emitted from the counter substrate side is not absorbed by the color filter layer when the liquid crystal layer is irradiated with light for polymer stabilization; thus, the entire liquid crystal layer can be uniformly irradiated with light. Therefore, alignment disorder of liquid crystals due to nonuniform photopolymerization, display unevenness due to the alignment disorder, and the like can be prevented.

As the chromatic-color light-transmitting resin that can be used for the color filter layer, a photosensitive organic resin or a non-photosensitive organic resin can be used. A photosensitive organic resin layer is preferably used because the number of resist masks can be reduced and the process can be simplified.

Chromatic colors are colors except achromatic colors such as black, gray, and white. In order to function as a color filter, the coloring layer is made of a material which transmits only the chromatic color light. As the chromatic color, red, green, blue, or the like can be used. Alternatively, cyan, magenta, yellow, or the like may be used. "Transmitting only the chromatic color light" means that light transmitted through the coloring layer has a peak at the wavelength of the chromatic color light.

The thickness of the color filter layer may be controlled as appropriate in consideration of the relationship between the concentration of the coloring material to be included and the transmittance of light.

In the case where the thickness of the chromatic-color light-transmitting resin layer varies depending on the color or in the case where there is unevenness due to a light-blocking layer or a transistor, an insulating layer which transmits light in the visible wavelength range (a so-called colorless and transparent insulating layer) may be stacked for planarization. The improved planarization allows favorable coverage with a pixel electrode layer formed over the color filter layer, and a uniform gap (thickness) of a liquid crystal layer, whereby the visibility of the liquid crystal display device is increased and higher image quality can be achieved.

In the case where the color filter is provided on the outer side of a substrate, the color filter can be attached to the substrate with an adhesive layer or the like. If the color filter is provided on the outer side of a counter substrate, polymer stabilization of a blue phase is performed by light irradiation, and then the color filter is provided on the outer side of the counter substrate.

As a light source, a backlight, a sidelight, or the like may be used. Light from the light source passes through the color filter to the viewing side, so that color display can be performed. As a light source, a cold cathode tube or a white light-emitting diode can be used. In addition, an optical member such as a reflection plate, a diffusion plate, a polarizing plate, or a retardation plate can be provided.

This embodiment can be implemented in appropriate combination with the structures described in the other embodiments.

Thus, a color display function can be added to the liquid crystal display device with high contrast and low power consumption.

Embodiment 6

Figure 6:
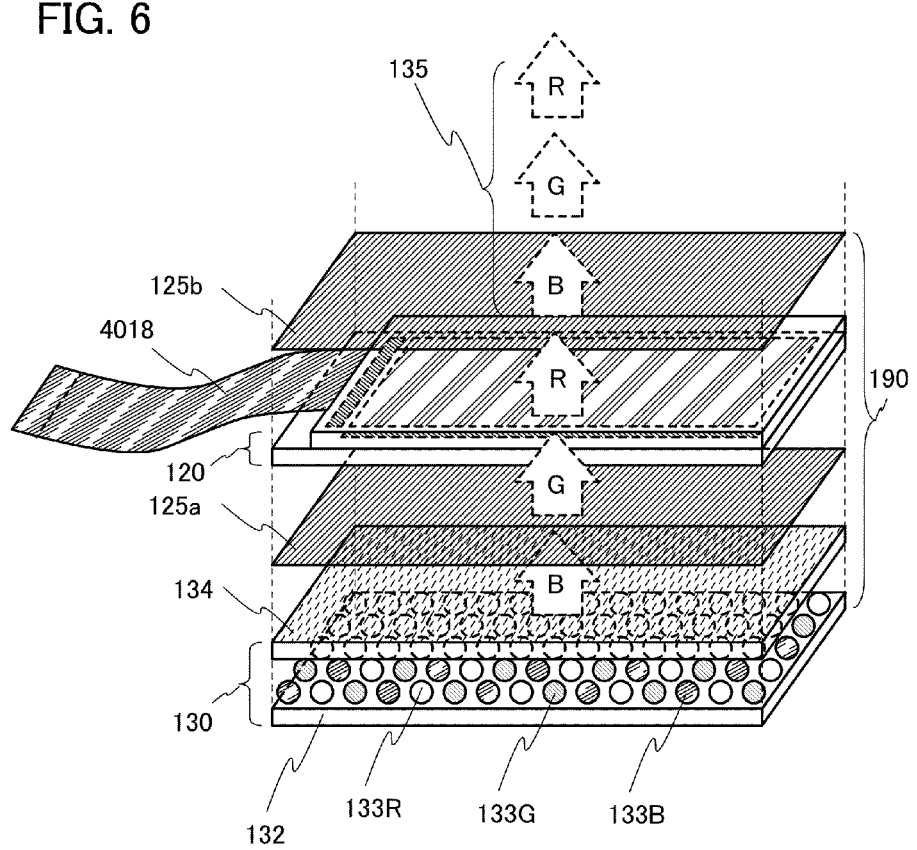
FIG. 6 illustrates a liquid crystal display module.

Described is an example of forming a liquid crystal display module as the liquid crystal display device disclosed in this specification. In this embodiment, a structure of a liquid crystal display module 190 is illustrated in FIG. 6 as an example of the liquid crystal display module performing color display.

The liquid crystal display module 190 includes a backlight portion 130, a liquid crystal display panel 120 in which liquid crystal elements are arranged in matrix, and a polarizing plate 125*a* and a polarizing plate 125*b* with the liquid crystal display panel 120 interposed therebetween. In the backlight portion 130, light-emitting elements, for example, LEDs (133R, 133G, and 133B) of the three primary colors are arranged in matrix, and the backlight portion 130 may include a diffusion plate 134 provided between the liquid crystal display panel 120 and the light-emitting element. A flexible printed circuit (FPC) 4018 serving as an external input terminal is electrically connected to a terminal portion provided in the display panel 120.

As the liquid crystal display panel 120, the liquid crystal display device shown in any of Embodiments 1 to 4 can be used.

In this embodiment, employed is a successive additive color mixing method (a field sequential method) in which color display is performed by time division using light-emitting diodes (LEDs).

The backlight portion 130 includes a backlight control circuit and a backlight 132. The backlight 132 includes the LEDs 133R, 133G, and 133B as light-emitting elements.

In this embodiment, the backlight 132 includes the LEDs 133R, 133G, and 133B as a plurality of light-emitting elements 133 of different emission colors. As a combination of different emission colors, for example, three kinds of light-emitting elements of red (R), green (G), and blue (B) can be used. A full-color image can be displayed by using the three primary colors: R, G and B.

In addition to the light-emitting elements of R, G, and B, another light-emitting element may be provided which emits a color obtained when two or more of the light-emitting elements of R, G, and B emit light at the same time (for example, yellow (Y) expressed by R and G, cyan (C) expressed by G and B, magenta (M) expressed by B and R, or the like).

In order to improve the color reproduction characteristics of the liquid crystal display device, a light-emitting element emitting light of a color other than the three primary colors may also be added. The color that can be expressed using the light-emitting elements of R, G, and B is limited to colors existing in the triangle made by the three points on the chromaticity diagram which correspond to the emission colors of the respective light-emitting elements. Therefore, by additionally providing a light-emitting element of a color existing outside the triangle on the chromaticity diagram, the color reproduction characteristics of the display device can be improved.

For example, a light-emitting element emitting the following color can be used in addition to the light-emitting elements of R, G, and B in the backlight 132: deep blue (DB) represented by a point positioned substantially outside the triangle in a direction from the center of the chromaticity diagram toward the point on the chromaticity diagram corresponding to the blue-light-emitting element B; or deep red (DR) represented by a point positioned substantially outside the triangle in a direction from the center of the chromaticity diagram toward the point on the chromaticity diagram corresponding to the red-light-emitting element R.

In FIG. 6, three colors of light 135 are schematically denoted by arrows (R, G, and B). Pulsed light of different colors sequentially emitted from the backlight portion 130 is modulated by a liquid crystal element of the liquid crystal display panel 120 which operates in synchronization with the backlight portion 130, and reaches a viewer through the liquid crystal display module 190. The viewer perceives the sequentially emitted light as an image.

In the liquid crystal display device shown in this embodiment, a full-color image can be displayed without using a color filter. Light use efficiency is high because a color filter does not absorb light from the backlight, whereby power consumption is suppressed even in display of a full-color image.

This embodiment can be implemented in appropriate combination with the structures described in the other embodiments.

Thus, a color display function can be added to the liquid crystal display device with high contrast and low power consumption.

Embodiment 7

This embodiment shows an example of the transistor that can be applied to the liquid crystal display device disclosed in this specification. There is no particular limitation on the structure of the transistor that can be applied to the liquid crystal display device disclosed in this specification; for example, a staggered type or planar type transistor having a top-gate structure or a bottom-gate structure can be employed. The transistor may have a single-gate structure including one channel formation region, a double-gate structure including two channel formation regions, or a triple-gate structure including three channel formation regions. Alternatively, the transistor may have a dual-gate structure including two gate electrode layers positioned over and below a channel formation region with gate insulating layers interposed therebetween. FIGS. 7A to 7D each illustrate an example of the cross-sectional structure of the transistor.

Figure 7A:
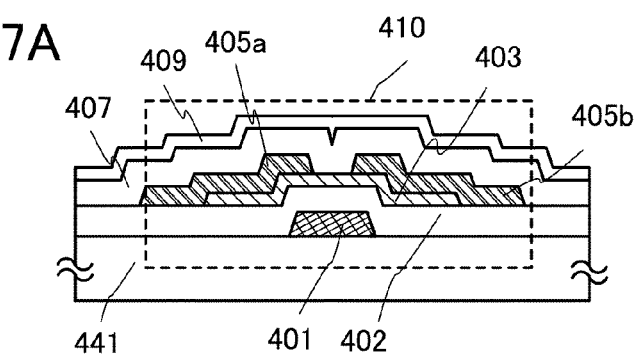
FIGS. 7A to 7D illustrate transistors that can be applied to a liquid crystal display device.

A transistor 410 illustrated in FIG. 7A is a kind of bottom-gate thin film transistor and is also referred to as an inverted staggered thin film transistor.

The transistor 410 includes, over a first substrate 441 having an insulating surface, a gate electrode layer 401, a gate insulating layer 402, a semiconductor layer 403, a source electrode layer 405a, and a drain electrode layer 405b. An insulating film 407 that covers the transistor 410 is stacked over the semiconductor layer 403. An insulating film 409 is further formed over the insulating film 407.

Figure 7B:
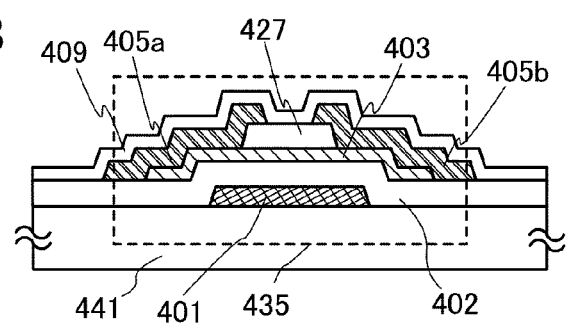

A transistor 435 illustrated in FIG. 7B is a kind of bottom-gate transistor referred to as a channel-protective transistor (a channel-stop transistor) and is also referred to as an inverted staggered thin film transistor.

The transistor 435 includes, over the first substrate 441 having an insulating surface, the gate electrode layer 401, the gate insulating layer 402, the semiconductor layer 403, an insulating film 427 serving as a channel-protective layer covering a channel formation region of the semiconductor layer 403, the source electrode layer 405a, and the drain electrode layer 405b. The insulating film 409 is formed to cover the transistor 435.

Figure 7C:
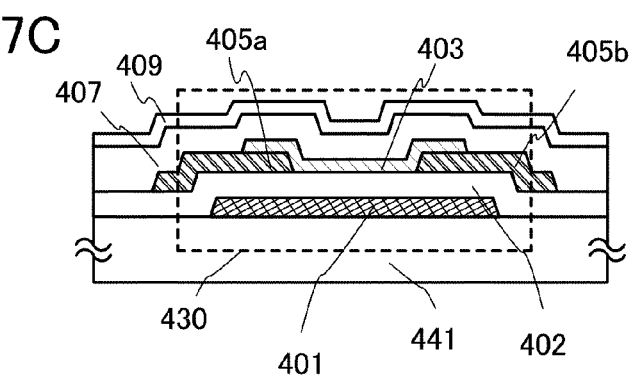

A transistor 430 illustrated in FIG. 7C is a bottom-gate thin film transistor and includes, over the first substrate 441 having an insulating surface, the gate electrode layer 401, the gate insulating layer 402, the source electrode layer 405a, the drain electrode layer 405b, and the semiconductor layer 403. In addition, the insulating film 407 covering the transistor 430 is provided in contact with the semiconductor layer 403. The insulating film 409 is further formed over the insulating film 407.

In the transistor 430, the gate insulating layer 402 is provided over and in contact with the first substrate 441 and the gate electrode layer 401, and the source electrode layer 405a and the drain electrode layer 405b are provided over and in contact with the gate insulating layer 402. Further, the semiconductor layer 403 is provided over the gate insulating layer 402, the source electrode layer 405a, and the drain electrode layer 405b.

Figure 7D:
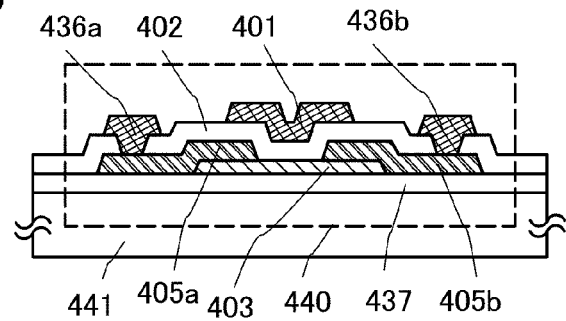

A transistor 440 illustrated in FIG. 7D is a kind of top-gate thin film transistor. The transistor 440 includes, over the first substrate 441 having an insulating surface, an insulating layer 437, the semiconductor layer 403, the source electrode layer 405a, the drain electrode layer 405b, the gate insulating layer 402, and the gate electrode layer 401. A wiring layer 436a and a wiring layer 436b are provided in contact with and electrically connected to the source electrode layer 405a and the drain electrode layer 405b, respectively.

A source region and a drain region (also referred to as semiconductor layers having one conductivity type, or buffer layers) may be provided between the semiconductor layer and the source and drain electrode layers. For example, a semiconductor layer having n-type conductivity is used for the source region and the drain region.

In the case where a semiconductor layer is used for the source or drain region of the transistor, the semiconductor layer preferably has a smaller thickness and higher conductivity (electric conductivity) than the semiconductor layer serving as a channel formation region.

The conductive films such as the wiring layer 436a and the wiring layer 436b connected to the source electrode layer 405a and the drain electrode layer 405b can be made of a material similar to that of the source electrode layer 405a and the drain electrode layer 405b.

The insulating films 427 and 437 can be made of a material similar to that of the insulating film 407, and typically, can be made of an inorganic insulating film such as a silicon oxide film, a silicon oxynitride film, an aluminum oxide film, or an aluminum oxynitride film.

Moreover, as in Embodiment 3, the interlayer film 413 may be formed over the insulating film 409 as a planarization insulating film to reduce surface unevenness due to the transistor.

This embodiment can be implemented in appropriate combination with the structures described in the other embodiments.

Embodiment 8

An oxide semiconductor will be described as the material that can be used for the semiconductor layers of the transistors shown in the above embodiments 3 to 7.

An oxide semiconductor layer can be used as the semiconductor layer 403 of the transistors 410, 430, 435, and 440 in FIGS. 7A to 7D shown in Embodiment 7.

As an oxide semiconductor used for the semiconductor layer 403, the following can be used: an In—Sn—Ga—Zn—O-based oxide semiconductor which is a four-component metal oxide; an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, and a Sn—Al—Zn—O-based oxide semiconductor which are three-component metal oxides; an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, and an In—Ga—O-based oxide semiconductor which are two-component metal oxides; and an In—O-based oxide semiconductor, a Sn—O-based oxide semiconductor, and a Zn—O-based oxide semiconductor. Further, $SiO_2$ may be contained in the above oxide semiconductor. Here, for example, the In—Ga—Zn—O-based oxide semiconductor means an oxide containing at least In, Ga, and Zn, and the composition ratio of the elements is not particularly limited. The In—Ga—Zn—O-based oxide semiconductor may contain an element other than In, Ga, and Zn.

For the oxide semiconductor layer, a thin film represented by the chemical formula, $InMO_3(ZnO)_m$ (m>0), can be used. Here, M represents one or more metal elements selected from Ga, Al, Mn, and Co. For example, M can be Ga, Ga and Al, Ga and Mn, or Ga and Co.

The transistors 410, 430, 435, and 440, each of which includes the oxide semiconductor layer, have a low current value in the off state (off-current value). Consequently, with the use of the transistor including the oxide semiconductor layer, an electrical signal such as an image signal can be retained for a longer time, and a writing interval can be set longer in the on state. Since the frequency of refresh operation can be reduced accordingly, the power consumption can be further suppressed.

Furthermore, the transistors 410, 430, 435, and 440 each including the oxide semiconductor layer as the semiconductor layer 403 have a relatively high field-effect mobility, which enables high-speed operation. Therefore, by using the transistors in a pixel portion of the liquid crystal display device, a high-quality image can be provided. Since the transistors can be separately formed over one substrate in a driver circuit portion and a pixel portion, the number of components can be reduced in the liquid crystal display device.

This embodiment can be implemented in appropriate combination with the structures described in the other embodiments.

Embodiment 9

In this embodiment, another example of the transistor including an oxide semiconductor layer, and a manufacturing method thereof will be described in detail with reference to FIGS. 8A to 8E. The same portion as or a portion having a function similar to those in the above embodiments can be formed in steps similar to those in the above embodiments, and repetitive description is omitted. Detailed description of the same portions is also omitted.

FIGS. 8A to 8E illustrate an example of the cross-sectional structure of a transistor. A transistor 510 illustrated in FIGS. 8A to 8E is a bottom-gate inverted staggered thin film transistor which is similar to the transistor 410 illustrated in FIG. 7A.

An oxide semiconductor used for a semiconductor layer in this embodiment is an i-type (intrinsic) or substantially i-type (intrinsic) oxide semiconductor. The i-type (intrinsic) or substantially i-type (intrinsic) oxide semiconductor is obtained in such a manner that hydrogen, which is an n-type impurity, is removed from an oxide semiconductor and the oxide semiconductor is highly purified so as to contain impurities, which are not main components of the oxide semiconductor, as little as possible. In other words, a highly-purified i-type (intrinsic) semiconductor or a semiconductor close thereto is obtained not by adding impurities but by reducing impurities such as hydrogen or water as much as possible. This enables the Fermi level ($E_f$) to be at the same level as the intrinsic Fermi level ($E_i$). Thus, the oxide semiconductor layer included in the transistor 510 is an oxide semiconductor layer which is highly purified and made to be electrically i-type (intrinsic).

Further, a highly-purified oxide semiconductor includes extremely few carriers (close to zero), and the carrier concentration thereof is lower than $1\times10^{14}/cm^3$, preferably lower than $1\times10^{12}/cm^3$, and more preferably lower than $1\times10^{11}/cm^3$.

Since the oxide semiconductor includes extremely few carriers, the off-current of the transistor can be reduced. It is preferable that the off-current be as low as possible.

Specifically, the current value in the off state (the off-current value) of the transistor 510 including the aforementioned oxide semiconductor layer, can be reduced to less than 10 zA per micrometer of channel width (less than 10 zA/μm), and further to less than 100 zA/μm at 85° C.

When a transistor having an extremely low current value in the off state (off-current value) is used as a transistor in a pixel portion, refresh operation in a still image area can be performed with a small number of times of writing image data.

The on-current of the transistor 510 including the aforementioned oxide semiconductor layer hardly depends on temperature and the off-current remains very low. Further, transistor characteristics hardly change due to light deterioration.

Steps of manufacturing the transistor 510 over a substrate 505 will be described below with reference to FIGS. 8A to 8E.

First, a conductive film is formed over the substrate 505 having an insulating surface; then, a gate electrode layer 511 is formed in a first photolithography step. Note that a resist mask may be formed by an inkjet method. In the case of forming a resist mask by an inkjet method, the manufacturing cost can be reduced because a photomask is not used.

As the substrate 505 having an insulating surface, a substrate similar to the first substrate 200 described in Embodiment 1 can be used. In this embodiment, a glass substrate is used as the substrate 505.

An insulating film serving as a base film may be provided between the substrate 505 and the gate electrode layer 511. The base film has a function of preventing diffusion of an impurity element from the substrate 505, and can be formed to have a single-layer structure or a multi-layer structure using one or more films selected from a silicon nitride film, a silicon oxide film, a silicon nitride oxide film, and a silicon oxynitride film.

The gate electrode layer 511 can be formed to have a single-layer structure or a multi-layer structure using a metal material such as molybdenum, titanium, tantalum, tungsten, aluminum, copper, neodymium, or scandium, or an alloy material containing any of these as a main component.

Then, a gate insulating layer 507 is formed over the gate electrode layer 511. The gate insulating layer 507 can be formed by a plasma CVD method, a sputtering method, or the like to have a single-layer structure or a multi-layer structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer.

For the oxide semiconductor in this embodiment, an i-type or substantially i-type oxide semiconductor from which impurities have been removed is used. Such a highly-purified oxide semiconductor is quite susceptible to an interface level or interface charge; therefore, the interface between the oxide semiconductor layer and the gate insulating layer is important. For that reason, the gate insulating layer in contact with the highly-purified oxide semiconductor needs to have high quality.

For example, a high-density plasma CVD method using microwaves (with a frequency of 2.45 GHz, for example) is preferably employed because a dense insulating layer having high withstand voltage and high quality can be formed. When a highly-purified oxide semiconductor and a high-quality gate insulating layer are in close contact with each other, the interface level can be reduced and good interface characteristics can be obtained.

It is needless to say that another film formation method such as a sputtering method or a plasma CVD method can be employed as long as a high-quality insulating layer can be formed as a gate insulating layer. Moreover, it is possible to form an insulating layer whose quality and characteristics of an interface with an oxide semiconductor are improved through heat treatment performed after the formation of the insulating layer. In any case, an insulating layer needs to have not only favorable quality as the gate insulating layer, but also lower interface state density with an oxide semiconductor to form a favorable interface.

Further, in order that hydrogen, hydroxyl groups, and moisture might be contained in the gate insulating layer 507 and an oxide semiconductor film 530 as little as possible, as pretreatment for formation of the oxide semiconductor film 530, the substrate 505 over which the gate electrode layer 511 is formed or the substrate 505 over which layers up to the gate insulating layer 507 are formed is preferably preheated in a preheating chamber of a sputtering apparatus, so that impurities such as hydrogen and moisture adsorbed to the substrate 505 are eliminated and evacuation is performed. Note that a cryopump is preferably provided as an evacuation unit in the preheating chamber. This preheating treatment may be omitted. This preheating step may also be performed on the substrate 505 over which layers up to a source electrode layer 515a and a drain electrode layer 515b are formed before formation of an insulating film 516.

Figure 8A:
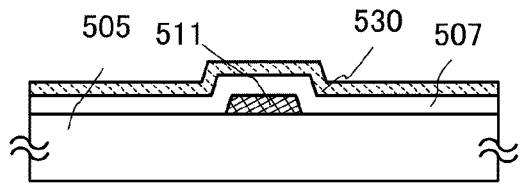
FIGS. 8A to 8E illustrate a transistor that can be applied to a liquid crystal display device, and a manufacturing method of the transistor.
Figure 8B:
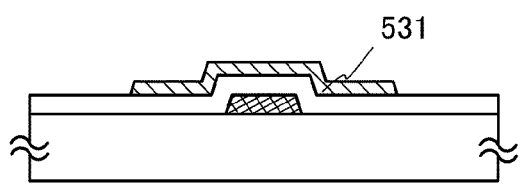

Next, the oxide semiconductor film 530 having a thickness of 2 nm to 200 nm inclusive, preferably 5 nm to 30 nm inclusive is formed over the gate insulating layer 507 (see FIG. 8A).

Note that before the oxide semiconductor film 530 is formed by a sputtering method, powdery substances (also referred to as particles or dust) attached to a surface of the gate insulating layer 507 are preferably removed by reverse sputtering in which plasma is generated by introduction of an argon gas. The reverse sputtering refers to a method in which, without application of voltage to a target side, an RF power source is used for application of voltage to a substrate side in an argon atmosphere to generate plasma in the vicinity of the substrate to modify a surface. Note that instead of an argon atmosphere, a nitrogen atmosphere, a helium atmosphere, an oxygen atmosphere, or the like may be used.

For the oxide semiconductor film 530, it is possible to use the oxide semiconductor described in Embodiment 8, such as a four-component metal oxide, a three-component metal oxide, a two-component metal oxide, an In—O-based oxide semiconductor, a Sn—O-based oxide semiconductor, or a Zn—O-based oxide semiconductor. Further, $SiO_2$ may be contained in the above oxide semiconductor. In this embodiment, the oxide semiconductor film 530 is formed by a sputtering method with the use of an In—Ga—Zn—O-based oxide semiconductor target. A cross-sectional view in this step is illustrated in FIG. 8A. The oxide semiconductor film 530 can be formed by a sputtering method in a rare gas (typically argon) atmosphere, an oxygen atmosphere, or a mixed atmosphere containing a rare gas and oxygen.

As a target for forming the oxide semiconductor film 530 by a sputtering method, for example, a target with a composition ratio of $In_2O_3:Ga_2O_3:ZnO=1:1:1$ [molar ratio] (i.e., In:Ga:Zn=1:1:0.5 [atomic ratio]), can be used. Alternatively, a target having a composition ratio of In:Ga:Zn=1:1:1 [atomic ratio] or a composition ratio of In:Ga:Zn=1:1:2 [atomic ratio] may be used. The filling rate of the oxide target is greater than or equal to 90% and less than or equal to 100%, preferably greater than or equal to 95% and less than or equal to 99.9%. With the use of a metal oxide target with a high filling rate, an oxide semiconductor film having high density can be obtained.

A high-purity gas from which impurities such as hydrogen, water, hydroxyl groups, or hydride have been removed is preferably used as a sputtering gas for forming the oxide semiconductor film 530.

The substrate is held in a deposition chamber kept under reduced pressure, and the substrate temperature is set to 100° C. to 600° C. inclusive, preferably 200° C. to 400° C. inclusive. By forming the oxide semiconductor film while heating the substrate, the concentration of impurities included in the formed oxide semiconductor film can be reduced. In addition, damage due to sputtering can be reduced. Then, a sputtering gas from which hydrogen and moisture have been removed is introduced into the deposition chamber while moisture remaining therein is removed, and the oxide semiconductor film 530 is formed over the substrate 505 with the use of the above target. In order to remove moisture remaining in the deposition chamber, an entrapment vacuum pump such as a cryopump, an ion pump, or a titanium sublimation pump is preferably used. The evacuation unit may be a turbo pump provided with a cold trap. In the deposition chamber which is evacuated with the cryopump, a hydrogen atom, a compound containing a hydrogen atom, such as water ($H_2O$), (more preferably, also a compound containing a carbon atom), and the like are removed, whereby the concentration of impurities in the oxide semiconductor film formed in the deposition chamber can be reduced.

An example of the deposition conditions is as follows: the distance between the substrate and the target is 100 mm, the pressure is 0.6 Pa, the direct-current (DC) power source is 0.5 kW, and the atmosphere is an oxygen atmosphere (the proportion of the oxygen flow rate is 100%). Note that a pulsed direct-current power source is preferably used, in which case powdery substances (also referred to as particles or dust) generated in deposition can be reduced and the film thickness can be uniform.

Next, the oxide semiconductor film 530 is processed into an island-shaped oxide semiconductor layer in a second photolithography step. A resist mask for forming the island-shaped oxide semiconductor layer may be formed by an inkjet method. In the case of forming a resist mask by an inkjet method, the manufacturing cost can be reduced because a photomask is not used.

In the case where a contact hole is formed in the gate insulating layer 507, the step of forming the contact hole can be performed at the same time as the processing of the oxide semiconductor film 530.

Note that the oxide semiconductor film 530 may be etched dry etching or wet etching, or both dry etching and wet etching. As an etchant used for wet etching of the oxide semiconductor film 530, for example, a mixed solution of phosphoric acid, acetic acid, and nitric acid can be used. Alternatively, ITO07N (produced by KANTO CHEMICAL CO., INC.) may be used.

Next, the oxide semiconductor layer is subjected to first heat treatment, so that the oxide semiconductor layer can be dehydrated or dehydrogenated. The temperature of the first heat treatment is higher than or equal to 400° C. and lower than or equal to 750° C., preferably higher than or equal to 400° C. and lower than the strain point of the substrate. Here, the substrate is put in an electric furnace which is a kind of heat treatment apparatus and heat treatment is performed on the oxide semiconductor layer at 450° C. for one hour in a nitrogen atmosphere, and then, the oxide semiconductor layer is not exposed to the air so that entry of water and hydrogen into the oxide semiconductor layer is prevented; thus, an oxide semiconductor layer 531 is obtained (see FIG. 8B).

Note that a heat treatment apparatus is not limited to an electrical furnace, and a device for heating an object to be processed by heat conduction or heat radiation from a heating element such as a resistance heating element, may be used. For example, an RTA (rapid thermal anneal) apparatus such as a GRTA (gas rapid thermal anneal) apparatus or an LRTA (lamp rapid thermal anneal) apparatus can be used. The LRTA apparatus is an apparatus for heating an object to be processed by radiation of light (an electromagnetic wave) emitted from a lamp such as a halogen lamp, a metal halide lamp, a xenon arc lamp, a carbon arc lamp, a high-pressure sodium lamp, or a high-pressure mercury lamp. The GRTA apparatus is an apparatus for heat treatment using a high-temperature gas. As the high-temperature gas, an inert gas which does not react with an object to be processed by heat treatment, like nitrogen or a rare gas such as argon is used.

For example, as the first heat treatment, GRTA may be performed in which the substrate is moved into an inert gas heated to a temperature as high as 650° C. to 700° C., heated for several minutes, and moved out of the inert gas heated to the high temperature.

Note that in the first heat treatment, it is preferable that water, hydrogen, and the like be not contained in the atmosphere of nitrogen or a rare gas such as helium, neon, or argon. It is preferable that the purity of nitrogen or the rare gas such as helium, neon, or argon which is introduced into a heat treatment apparatus be set to higher than or equal to 6N (99.9999%), preferably higher than or equal to 7N (99.99999%) (that is, the impurity concentration is lower than or equal to 1 ppm, preferably lower than or equal to 0.1 ppm).

After the oxide semiconductor layer is heated in the first heat treatment, a high-purity oxygen gas, a high-purity $N_2O$ gas, or ultra-dry air (having a dew point of −40° C. or lower, preferably −60° C. or lower) may be introduced into the furnace. It is preferable that the oxygen gas or the $N_2O$ gas do not include water, hydrogen, and the like. The purity of the oxygen gas or the $N_2O$ gas introduced into the heat treatment apparatus is preferably higher than or equal to 6N, preferably higher than or equal to 7N (i.e., the concentration of an impurity in the oxygen gas or the $N_2O$ gas is lower than or equal to 1 ppm, preferably lower than or equal to 0.1 ppm). Oxygen, which is a main component of an oxide semiconductor and which has been reduced in the step of removing impurities by dehydration or dehydrogenation, is supplied by the action of the oxygen gas or the $N_2O$ gas, so that the oxide semiconductor layer can be a highly-purified and electrically i-type (intrinsic) oxide semiconductor.

The first heat treatment of the oxide semiconductor layer may be performed on the oxide semiconductor film 530 before being processed into the island-shaped oxide semiconductor layer. In that case, after the first heat treatment, the substrate is taken out from the heat treatment apparatus, and then a photolithography step is performed.

The timing at which the first heat treatment is performed is not limited to the aforementioned one, and the first heat treatment may be performed at the following timing after the oxide semiconductor layer is formed: after a source electrode layer and a drain electrode layer are formed over the oxide semiconductor layer; or after an insulating layer is formed over the source electrode layer and the drain electrode layer.

In the case where a contact hole is formed in the gate insulating layer 507, the step of forming the contact hole may be performed either before or after the oxide semiconductor film 530 is subjected to the first heat treatment.

Alternatively, an oxide semiconductor layer may be formed through two deposition steps and two heat treatment steps. The thus formed oxide semiconductor layer has a thick crystalline region (a single crystal region), that is, a crystalline region whose c-axis is aligned in a direction perpendicular to a surface of the layer, even when a base component is made of an oxide, a nitride, a metal, or the like. For example, a first oxide semiconductor film with a thickness of 3 nm to 15 nm is deposited, and first heat treatment is performed in a nitrogen, oxygen, rare gas, or dry air atmosphere at 450° C. to 850° C. inclusive, preferably 550° C. to 750° C. inclusive, so that the first oxide semiconductor film having a crystalline region (including a plate-like crystal) is formed in a region including its surface. Then, a second oxide semiconductor film which has a larger thickness than the first oxide semiconductor film is formed, and second heat treatment is performed at 450° C. to 850° C. inclusive, preferably 600° C. to 700° C. inclusive, so that crystal growth proceeds upward with the first oxide semiconductor film used as a seed of the crystal growth and the whole second oxide semiconductor film is crystallized. In such a manner, the oxide semiconductor layer having a thick crystalline region can be obtained.

Next, a conductive film to be a source electrode layer and a drain electrode layer (including a wiring formed using the same layer as these electrode layers) is formed over the gate insulating layer 507 and the oxide semiconductor layer 531. The conductive film to be the source electrode layer and the drain electrode layer can be made of the material used for the source electrode layer 405a and the drain electrode layer 405b shown in Embodiment 3.

Figure 8C:
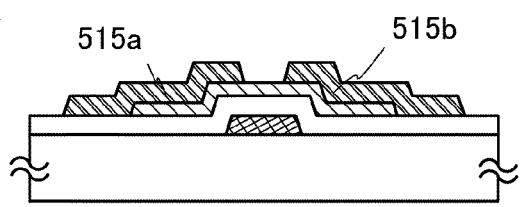

A resist mask is formed over the conductive film in a third photolithography step, and the source electrode layer 515a and the drain electrode layer 515b are formed by selective etching; then, the resist mask is removed (see FIG. 8C).

Light exposure at the time of the formation of the resist mask in the third photolithography step may be performed using ultraviolet light, KrF laser light, or ArF laser light. The channel length L of a transistor that is completed later is determined by the distance between bottom ends of the source electrode layer and the drain electrode layer, which are adjacent to each other over the oxide semiconductor layer 531. In the case where the channel length L is less than 25 nm, extreme ultraviolet light having an extremely short wavelength of several nanometers to several tens of nanometers may be used for light exposure at the time of formation of the resist mask in the third photolithography step. Light exposure using extreme ultraviolet enables high resolution and deep depth of focus. Thus, the channel length L of the transistor to be formed later can be longer than or equal to 10 nm and shorter than or equal to 1000 nm, and the circuit can operate at higher speed.

In order to reduce the number of photomasks and steps in the photolithography process, an etching step may be performed with the use of a multi-tone mask which is a light-exposure mask through which light is transmitted so as to have a plurality of intensities. A resist mask formed with the use of a multi-tone mask has a plurality of thicknesses and further can be changed in shape by etching; thus, the resist mask can be used in a plurality of etching steps for processing into different patterns. Consequently, a resist mask corresponding to at least two kinds or more of different patterns can be formed by one multi-tone mask. Thus, the number of light-exposure masks can be reduced and the number of corresponding photolithography steps can also be reduced, whereby simplification of a process can be realized.

Note that it is preferable that etching conditions be optimized so as not to etch and divide the oxide semiconductor layer 531 when the conductive film is etched. However, it is difficult to obtain the conditions under which only the conductive film is etched and the oxide semiconductor layer 531 is not etched at all. Therefore, at the time of etching of the conductive film, part of the oxide semiconductor layer 531 is etched in some cases to be an oxide semiconductor layer having a groove (a depressed portion).

In this embodiment, a Ti film is used as the conductive film and an In—Ga—Zn—O-based oxide semiconductor is used for the oxide semiconductor layer 531; thus, an ammonia hydrogen peroxide mixture (a mixed solution of ammonia, water, and a hydrogen peroxide solution) is used as an etchant.

Next, plasma treatment may be performed using a gas such as $N_2O$, $N_2$, or Ar, so that water or the like adsorbed to an exposed surface of the oxide semiconductor layer can be removed. In the case where the plasma treatment is performed, the insulating film 516 serving as a protective insulating film in contact with part of the oxide semiconductor layer is formed without exposure to the air.

The insulating film 516 can be formed to a thickness of at least 1 nm by a method such as a sputtering method, in which an impurity such as water or hydrogen does not enter the insulating film 516. When hydrogen is contained in the insulating film 516, entry of hydrogen to the oxide semiconductor layer, or extraction of oxygen in the oxide semiconductor layer by hydrogen may occur, thereby causing the backchannel of the oxide semiconductor layer to have lower resistance (to be n-type), so that a parasitic channel may be formed. Therefore, it is important that a formation method without using hydrogen be employed so that the insulating film 516 contains hydrogen as little as possible.

In this embodiment, a silicon oxide film with a thickness of 200 nm is formed as the insulating film 516 by a sputtering method. The substrate temperature in the film formation may be higher than or equal to room temperature and lower than or equal to 300° C.; in this embodiment, 100° C. The silicon oxide film can be formed by a sputtering method in a rare gas (typically, argon) atmosphere, an oxygen atmosphere, or a mixed atmosphere containing a rare gas and oxygen. As a target, a silicon oxide target or a silicon target may be used. For example, the silicon oxide film can be formed by a sputtering method using a silicon target in an atmosphere containing oxygen. The insulating film 516 is formed in contact with the oxide semiconductor layer, and is formed using an inorganic insulating film which does not contain impurities such as moisture, a hydrogen ion, and OH and blocks entry of these from the outside. Typically, a silicon oxide film, a silicon oxynitride film, an aluminum oxide film, an aluminum oxynitride film, a gallium oxide film, or the like is used.

In order to remove moisture remaining in the deposition chamber of the insulating film 516 as in the deposition of the oxide semiconductor film 530, an entrapment vacuum pump (such as a cryopump) is preferably used. When the insulating film 516 is formed in the deposition chamber evacuated using a cryopump, the impurity concentration in the insulating film 516 can be reduced. As an exhaustion unit for removing moisture remaining in the deposition chamber of the insulating film 516, a turbo pump provided with a cold trap may also be used.

A high-purity gas from which impurities such as hydrogen, water, hydroxyl groups, or hydride have been removed is preferably used as a sputtering gas for forming the insulating film 516.

Next, second heat treatment (preferably at 200° C. to 400° C. inclusive, for example, 250° C. to 350° C. inclusive) is performed in an inert gas atmosphere or an oxygen gas atmosphere. For example, the second heat treatment is performed in a nitrogen atmosphere at 250° C. for one hour. The second heat treatment is performed while part of the oxide semiconductor layer (a channel formation region) is in contact with the insulating film 516.

Through the above steps, impurities such as hydrogen, moisture, hydroxyl groups, or hydride (also referred to as a hydrogen compound) can be intentionally eliminated from the oxide semiconductor layer in the first heat treatment performed on the oxide semiconductor film; and it is also possible to supply oxygen, which is one of the main components of the oxide semiconductor and which has been reduced in the step of eliminating the impurities. Thus, a highly-purified and electrically i-type (intrinsic) oxide semiconductor layer is obtained.

Figure 8D:
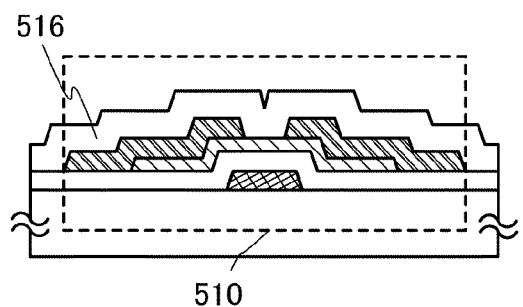
Figure 8E:
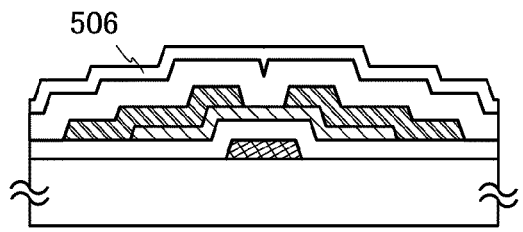

Through the above process, the transistor 510 is formed (see FIG. 8D).

When a silicon oxide layer having a lot of defects is used as the insulating film 516, impurities such as hydrogen, moisture, hydroxyl groups, or hydride contained in the oxide semiconductor layer are diffused to the oxide insulating layer by heat treatment after the formation of the silicon oxide layer, so that the impurities in the oxide semiconductor layer can be further reduced.

An insulating film 506 may be additionally formed over the insulating film 516. For example, a silicon nitride film is formed by an RF sputtering method. Since an RF sputtering method allows an increase in productivity, it is preferably used as a formation method of the protective insulating layer. The protective insulating layer is made using an inorganic insulating film which does not contain impurities such as moisture and blocks the entry of the impurities from the outside; for example, a silicon nitride film or an aluminum nitride film is used. In this embodiment, a silicon nitride film is formed as the insulating film 506 (see FIG. 8E).

In this embodiment, as the insulating film 506 serving as the protective insulating layer, a silicon nitride film is formed in the following manner: the substrate 505 over which the insulating film 516 is formed is heated to a temperature of 100° C. to 400° C. inclusive; a sputtering gas containing high-purity nitrogen from which hydrogen and moisture have been removed is introduced; and a silicon target is used. Also in this step, it is preferable that the insulating film 506 be formed while moisture remaining in the deposition chamber is removed as in the formation of the insulating film 516.

After the formation of the protective insulating layer, heat treatment may be further performed in the air at a temperature of 100° C. to 200° C. inclusive for 1 hour to 30 hours inclusive. This heat treatment may be performed at a fixed temperature. Alternatively, the following change in the heating temperature may be conducted plural times repeatedly: an increase from room temperature to a temperature of 100° C. to 200° C. inclusive and then a decrease to room temperature.

Although not illustrated, the interlayer film 413 is formed over the insulating film 516. The subsequent steps may be performed in a manner similar to those in Embodiment 3.

By thus using the transistor including a highly-purified oxide semiconductor layer manufactured in this embodiment, the current value in the off state (the off-current value) can be further reduced. Consequently, in driving the transistor, an electrical signal such as an image signal can be retained for a longer time, and a writing interval can be set longer. Since the frequency of refresh operation can be reduced, the power consumption can be further suppressed.

The capacitance of a storage capacitor provided in a liquid crystal display device is set in consideration of the leakage current or the like of a transistor placed in a pixel portion so that charges can be held for a predetermined period. The capacitance of the storage capacitor may be set in consideration of the off-current or the like of the transistor. In the case of using the transistor described in this embodiment which includes a high-purity oxide semiconductor layer, it is only necessary to provide a storage capacitor having capacitance which is less than or equal to ⅓, preferably less than or equal to ⅕ of liquid crystal capacitance in each pixel.

Furthermore, the transistor including a highly-purified oxide semiconductor layer has a high field-effect mobility, which enables high-speed operation. Therefore, by using the transistor in a pixel portion of the liquid crystal display device, a high-quality image can be provided. Since the transistor can be separately formed over one substrate in a driver circuit portion and a pixel portion, the number of components can be reduced in the liquid crystal display device.

In addition, when a blue-phase liquid crystal material is used, rubbing treatment on an alignment film is unnecessary, electrostatic discharge damage caused by the rubbing treatment can be prevented and defects and damage of the liquid crystal display device, such as variation in the electric characteristics of the transistor due to static electricity, can be reduced in the manufacturing process. Thus, the productivity of the liquid crystal display device can be increased.

The response speed of a blue-phase liquid crystal material is greater than or equal to ten times as high as that of a conventional liquid crystal material; therefore, by combining the blue-phase liquid crystal material with a device capable of double-frame rate (high-speed) driving, such as a transistor including an oxide semiconductor layer, a liquid crystal display device having a higher function and higher response speed can be realized.

Thus, it is more effective to use, as in this embodiment, a blue-phase liquid crystal material for a liquid crystal display device which includes a transistor using an oxide semiconductor layer.

This embodiment can be implemented in appropriate combination with the structures described in the other embodiments.

Embodiment 10

An example of another material that can be used for the semiconductor layers of the transistors in the above embodiments 3 to 7 will be described.

The semiconductor layer included in a semiconductor element can be made of the following material: an amorphous semiconductor manufactured by a sputtering method or a vapor-phase growth method using a semiconductor material gas typified by silane or germane; a polycrystalline semiconductor formed by crystallizing the amorphous semiconductor with the use of light energy or thermal energy; a microcrystalline semiconductor; or the like. The semiconductor layer can be formed by a sputtering method, an LPCVD method, a plasma CVD method, or the like.

A microcrystalline semiconductor film can be formed by a high-frequency plasma CVD method with a frequency of several tens to several hundreds of megahertz or by a microwave plasma CVD apparatus with a frequency of 1 GHz or more. Typically, the microcrystalline semiconductor film can be formed using a gas obtained by diluting a silicon hydride, such as $SaI_4$, $Si_2H_6$, $SiH_2Cl_2$, $SiHCl_3$, $SiCl_4$, or $SiF_4$, with hydrogen. Alternatively, the microcrystalline semiconductor film can be formed using a gas including a silicon hydride and hydrogen which is diluted with one or more rare gas elements selected from helium, argon, krypton, and neon. In this case, the flow rate of hydrogen is set 5 times to 200 times, preferably 50 times to 150 times, and further preferably 100 times, as high as that of a silicon hydride.

The amorphous semiconductor is typified by hydrogenated amorphous silicon, and the crystalline semiconductor is typified by polysilicon or the like. Polysilicon (polycrystalline silicon) includes so-called high-temperature polysilicon that contains polysilicon formed at a process temperature of 800° C. or higher as its main component, so-called low-temperature polysilicon that contains polysilicon formed at a process temperature of 600° C. or lower as its main component, and polysilicon formed by crystallizing amorphous silicon by using, for example, an element that promotes crystallization. It is needless to say that a microcrystalline semiconductor or a semiconductor partly including a crystalline phase can also be used as described above.

In the case of using a crystalline semiconductor film for the semiconductor layer, the crystalline semiconductor film may be manufactured by various methods (e.g., laser crystallization, thermal crystallization, or thermal crystallization using an element such as nickel that promotes crystallization). Alternatively, a microcrystalline semiconductor may be crystallized by laser irradiation to increase crystallinity. In the case where an element that promotes crystallization is not introduced, before being irradiated with laser light, an amorphous silicon film is heated at 500° C. for one hour in a nitrogen atmosphere, whereby hydrogen contained in the amorphous silicon film is discharged to allow its concentration to be $1 \times 10^{20}$ atoms/cm³ or less. This is because, if the amorphous silicon film contains much hydrogen, the amorphous silicon film is broken by laser irradiation.

There is no particular limitation on a method for introducing the metal element into an amorphous semiconductor film as long as the metal element can exist on the surface of or inside the amorphous semiconductor film. For example, a sputtering method, a CVD method, a plasma processing method (including a plasma CVD method), an adsorption method, or a method of applying a metal-salt solution can be employed. Among them, the method using a solution is simple and easy, and is useful in terms of easy concentration adjustment of the metal element. At this time, an oxide film is preferably formed on the surface of the amorphous semiconductor film by UV light irradiation in an oxygen atmosphere, thermal oxidation, treatment with ozone-containing water or hydrogen peroxide including a hydroxyl radical, or the like in order to improve its wettability and to spread the solution on the entire surface of the amorphous semiconductor film.

In the step of crystallizing an amorphous semiconductor film to form a crystalline semiconductor film, an element that promotes crystallization (also referred to as a catalytic element or a metal element) may be added to the amorphous semiconductor film and heat treatment (at 550° C. to 750° C. for 3 minutes to 24 hours) may be performed for crystallization. As the element that accelerates (promotes) crystallization, it is possible to use one or more kinds of elements selected from iron (Fe), nickel (Ni), cobalt (Co), ruthenium (Ru), rhodium (Rh), palladium (Pd), osmium (Os), iridium (Ir), platinum (Pt), copper (Cu), and gold (Au).

In order to remove or reduce the element that promotes crystallization of the crystalline semiconductor film, a semiconductor film containing an impurity element is formed in contact with the crystalline semiconductor film so as to function as a gettering sink. As the impurity element, an impurity element imparting n-type conductivity, an impurity element imparting p-type conductivity, a rare gas element, or the like can be used. For example, it is possible to use one or more kinds of elements selected from phosphorus (P), nitrogen (N), arsenic (As), antimony (Sb), bismuth (Bi), boron (B), helium (He), neon (Ne), argon (Ar), krypton (Kr), and xenon (Xe). A semiconductor film containing a rare gas element is formed in contact with the crystalline semiconductor film containing the element that promotes crystallization, and then heat treatment is performed (at 550° C. to 750° C. for 3 minutes to 24 hours). The element promoting crystallization which is contained in the crystalline semiconductor film moves into the semiconductor film containing a rare gas element, and thus the element promoting crystallization which is contained in the crystalline semiconductor film is removed or reduced. After that, the semiconductor film containing a rare gas element, which has functioned as a gettering sink, is removed.

The amorphous semiconductor film may be crystallized by a combination of thermal treatment and laser light irradiation. Alternatively, either thermal treatment or laser light irradiation may be performed plural times.

A crystalline semiconductor film can also be formed directly over the substrate by a plasma method. Alternatively, a crystalline semiconductor film may be selectively formed over the substrate by a plasma method.

This embodiment can be implemented in appropriate combination with the structures described in the other embodiments.

Embodiment 11

A liquid crystal display device having a display function can be manufactured by manufacturing transistors and using the transistors for a pixel portion and further for a driver circuit. When part or whole of the driver circuit is formed over the same substrate as the pixel portion with the use of the transistors, a system-on-panel can be obtained.

The liquid crystal display device includes a liquid crystal element (also referred to as a liquid crystal display element) as a display element.

The liquid crystal display device includes a panel in which a display element is sealed, and a module in which an IC or the like including a controller is mounted to the panel. This embodiment also relates to an element substrate, which corresponds to one mode before the display element is completed in a manufacturing process of the liquid crystal display device, and the element substrate is provided with a unit for supplying current to the display element in each of a plurality of pixels. Specifically, the element substrate may be in a state provided only with a pixel electrode of the display element, in a state after a conductive film to be a pixel electrode is formed and before the conductive film is etched to form the pixel electrode, or in any other state.

Note that the liquid crystal display device in this specification means an image display device, a display device, or a light source (including a lighting device). Further, the liquid crystal display device includes any of the following modules in its category: a module to which a connector such as a flexible printed circuit (FPC), a tape automated bonding (TAB) tape, or a tape carrier package (TCP) is attached; a module having a TAB tape or a TCP at the tip of which a printed wiring board is provided; and a module in which an integrated circuit (IC) is directly mounted on a display element by chip on glass (COG) method.

Figure 5B:
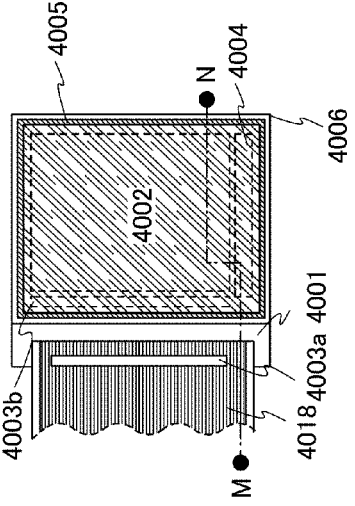
Figure 5B:
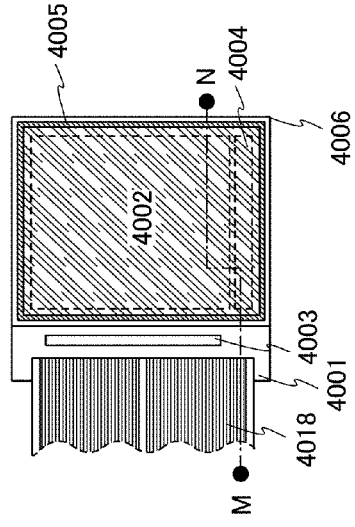
Figure 5B:
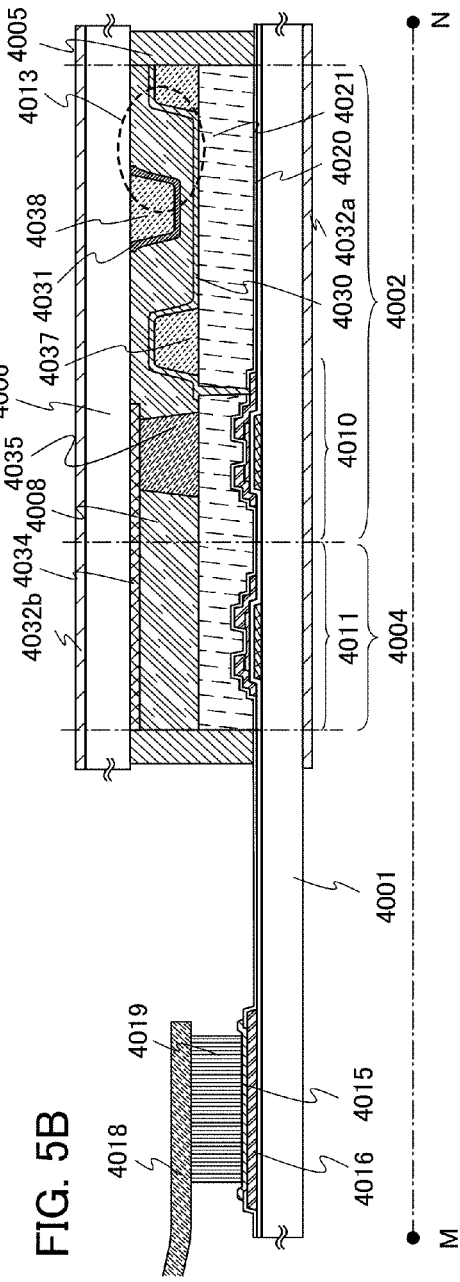

The appearance and cross section of a liquid crystal display panel, which is one embodiment of the liquid crystal display device, will be described with reference to FIGS. 5A1, 5A2, and 5B. FIGS. 5A1 and 5A2 are top views of a panel in which transistors 4010 and 4011, and a liquid crystal element 4013 are sealed between a first substrate 4001 and a second substrate 4006 with a sealant 4005. FIG. 5B is a cross-sectional view taken along line M-N of FIGS. 5A1 and 5A2.

The sealant 4005 is provided to surround a pixel portion 4002 and a scanning line driver circuit 4004 that are provided over the first substrate 4001. The second substrate 4006 is provided over the pixel portion 4002 and the scanning line driver circuit 4004. Therefore, the pixel portion 4002 and the scanning line driver circuit 4004 are sealed together with a liquid crystal layer 4008, by the first substrate 4001, the sealant 4005, and the second substrate 4006.

In FIG. 5A1, a signal line driver circuit 4003 that is formed using a single crystal semiconductor film or a polycrystalline semiconductor film over a substrate separately prepared is mounted in a region different from the region surrounded by the sealant 4005 over the first substrate 4001. FIG. 5A2 illustrates an example in which part of a signal line driver circuit is formed over the first substrate 4001 with the use of a transistor. A signal line driver circuit 4003b is formed over the first substrate 4001 and a signal line driver circuit 4003a that is formed using a single crystal semiconductor film or a polycrystalline semiconductor film over a substrate separately prepared is mounted on the first substrate 4001.

Note that there is no particular limitation on the connection method of a driver circuit which is separately formed, and COG, wire bonding, TAB, or the like can be used. FIG. 5A1 illustrates an example of mounting the signal line driver circuit 4003 by COG, and FIG. 5A2 illustrates an example of mounting the signal line driver circuit 4003 by TAB.

The pixel portion 4002 and the scanning line driver circuit 4004 provided over the first substrate 4001 each include a plurality of transistors. FIG. 5B illustrates the transistor 4010 included in the pixel portion 4002 and the transistor 4011 included in the scanning line driver circuit 4004. An insulating layer 4020 and an interlayer film 4021 are provided over the transistors 4010 and 4011.

The thin film transistor shown in any of Embodiments 3 to 10 can be applied to the transistors 4010 and 4011.

Further, a conductive layer may be provided over the interlayer film 4021 or the insulating layer 4020 so as to overlap with a channel formation region of a semiconductor layer of the transistor 4011 for the driver circuit. The conductive layer may have the same potential as or a potential different from that of a gate electrode layer of the transistor 4011 and can function as a second gate electrode layer. Further, the potential of the conductive layer may be GND or 0 V, or the conductive layer may be in a floating state.

In addition, a pixel electrode layer 4030 is formed on a first structure body 4037 which is provided over the first substrate 4001 and the interlayer film 4021 to project into the liquid crystal layer 4008, and the pixel electrode layer 4030 is electrically connected to the transistor 4010. A common electrode layer 4031 is also formed on a second structure body 4038 which is provided over the second substrate 4006 to project into the liquid crystal layer 4008. The liquid crystal element 4013 includes the pixel electrode layer 4030, the common electrode layer 4031, and the liquid crystal layer 4008. Note that a polarizing plate 4032a and a polarizing plate 4032b are provided on the outer sides of the first substrate 4001 and the second substrate 4006, respectively. This embodiment shows an example in which the pixel electrode layer 4030 is formed as a plate-like continuous conductive film as illustrated in FIG. 2 in Embodiment 2. It is needless to say that the pixel electrode layer and the common electrode layer may have the structures illustrated in FIG. 1, FIG. 3, and FIG. 16.

The pixel electrode layer 4030 is formed to cover top and side surfaces of the rib-shaped first structure body 4037 provided over the first substrate 4001, and the common electrode layer 4031 is formed to cover top and side surfaces of the rib-shaped second structure body 4038 provided over the second substrate 4006. As a result, the area where the pixel electrode layer 4030 and the common electrode layer 4031 are formed can be increased in the thickness direction of the liquid crystal layer 4008 (three-dimensionally). Further, the first substrate 4001 and the second substrate 4006 are arranged to face each other so that the projections formed on the surfaces of the pixel electrode layer 4030 and the common electrode layer 4031, which cover the rib-shaped structure bodies, engage with each other.

Accordingly, when a voltage is applied between the pixel electrode layer 4030 and the common electrode layer 4031, an electric field can be widely formed between the pixel electrode layer 4030 and the common electrode layer 4031, and liquid crystal molecules can be controlled using the electric field.

It is thus possible to make liquid crystal molecules respond in the entire liquid crystal layer including the thickness direction, resulting in an improvement in white transmittance. Consequently, the contrast ratio, which is the ratio of white transmittance to black transmittance, can also be increased.

As the first substrate 4001 and the second substrate 4006, a glass substrate, a plastic substrate, or the like having light-transmitting properties can be used. As the plastic substrate, a fiberglass-reinforced plastics (FRP) plate, a polyvinyl fluoride (PVF) film, a polyester film, or an acrylic resin film can be used. Further, a sheet in which aluminum foil is sandwiched between PVF films or polyester films can also be used.

A columnar spacer denoted by reference numeral 4035 is obtained by selective etching of an insulating film and is provided in order to control the thickness (a cell gap) of the liquid crystal layer 4008. Alternatively, a spherical spacer may be used. In the liquid crystal display device including the liquid crystal layer 4008, the thickness (the cell gap) of the liquid crystal layer 4008 is preferably greater than or equal to 1 μm and less than or equal to 20 μm. In this specification, the thickness of a cell gap refers to the maximum thickness (film thickness) of a liquid crystal layer.

Although FIGS. 5A1, 5A2, and 5B illustrate an example of a transmissive liquid crystal display device, an embodiment of the present invention can also be applied to a transflective liquid crystal display device.

Further, FIGS. 5A1, 5A2, and 5B illustrate an example in which polarizing plates are provided on the outer side (the viewing side) of the substrates; however, the polarizing plates may be provided on the inner side of the substrates. Whether the polarizing plate is provided on the inner side or the outer side may be determined as appropriate depending on the material of the polarizing plate and conditions of the manufacturing process. Furthermore, a light-blocking layer functioning as a black matrix may be provided.

A color filter layer or a light-blocking layer may be formed as part of the interlayer film 4021. In FIGS. 5A1, 5A2, and 5B, a light-blocking layer 4034 is provided on the second substrate 4006 side so as to cover the transistors 4010 and 4011. By providing the light-blocking layer 4034, the contrast can be increased and the transistors can be stabilized more.

The transistors can be, but is not necessarily, covered with the insulating layer 4020 which functions as a protective film of the transistors.

Note that the protective film is provided to prevent entry of contaminant impurities floating in air, such as an organic substance, a metal substance, or moisture, and is preferably a dense film. The protective film may be formed by a sputtering method to have a single-layer structure or a multi-layer structure including any of a silicon oxide film, a silicon nitride film, a silicon oxynitride film, a silicon nitride oxide film, an aluminum oxide film, an aluminum nitride film, an aluminum oxynitride film, and an aluminum nitride oxide film.

Further, in the case of further forming a light-transmitting insulating layer as a planarization insulating film, the light-transmitting insulating layer can be made of an organic material having heat resistance, such as polyimide, acrylic, benzocyclobutene, polyamide, or epoxy. Other than such organic materials, it is also possible to use a low-dielectric constant material (a low-k material), a siloxane-based resin, phosphosilicate glass (PSG), borophosphosilicate glass (BPSG), or the like. The insulating layer may be formed by stacking a plurality of insulating films made of any of these materials.

There is no particular limitation on the method for forming the interlayer layers to be stacked, and the following method can be employed depending on the material: a sputtering method, spin coating, dip coating, spray coating, droplet discharging (such as ink jetting, screen printing, or offset printing), roll coating, curtain coating, knife coating, or the like.

The pixel electrode layer 4030 and the common electrode layer 4031 can be made of a light-transmitting conductive material such as indium oxide including tungsten oxide, indium zinc oxide including tungsten oxide, indium oxide including titanium oxide, indium tin oxide including titanium oxide, indium tin oxide (ITO), indium zinc oxide, or indium tin oxide to which silicon oxide is added.

The pixel electrode layer 4030 and the common electrode layer 4031 can also be made of one or a plurality of materials selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and a nitride thereof.

Alternatively, the pixel electrode layer 4030 and the common electrode layer 4031 can be made of a conductive composition including a conductive high molecule (also referred to as a conductive polymer).

A variety of signals and potentials are supplied from an FPC 4018 to the signal line driver circuit 4003 that is formed separately, and the scan line driver circuit 4004 or the pixel portion 4002.

Further, since the transistor is easily broken by static electricity or the like, a protection circuit for protecting the driver circuit is preferably provided over the same substrate for a gate line or a source line. The protection circuit is preferably formed using a nonlinear element.

In FIGS. 5A1, 5A2, and 5B, a connection terminal electrode 4015 is formed using the same conductive film as the pixel electrode layer 4030, and a terminal electrode 4016 is formed using the same conductive film as source electrode layers and drain electrode layers of the transistors 4010 and 4011.

The connection terminal electrode 4015 is electrically connected to a terminal included in the FPC 4018 through an anisotropic conductive film 4019.

Although FIGS. 5A1, 5A2, and 5B illustrate an example in which the signal line driver circuit 4003 is formed separately and mounted on the first substrate 4001, an embodiment of the present invention is not limited to this structure. The scan line driver circuit may be formed separately and then mounted, or only part of the signal line driver circuit or part of the scan line driver circuit may be formed separately and then mounted.

In the above manner, the contrast ratio of the liquid crystal display device including a liquid crystal layer exhibiting a blue phase can be increased.

In addition, high white transmittance can be obtained with lower voltage, resulting in a reduction in the power consumption of the liquid crystal display device.

This embodiment can be implemented in appropriate combination with the structures described in the other embodiments.

Embodiment 12

The liquid crystal display device disclosed in this specification can be applied to a variety of electronic devices (including game machines). Examples of the electronic devices are a television set (also referred to as a television or a television receiver), a monitor of a computer or the like, a camera such as a digital camera or a digital video camera, a digital photo frame, a mobile phone handset (also referred to as a mobile phone or a mobile phone device), a portable game machine, a personal digital assistant, an audio reproducing device, and a large-sized game machine such as a pachinko machine.

Figure 9A:
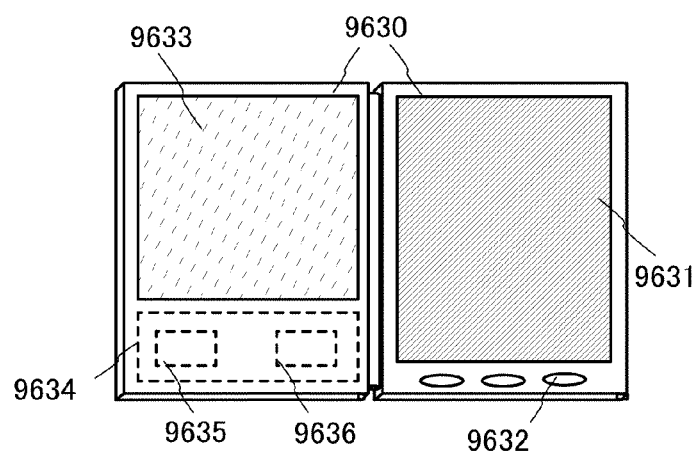
FIGS. 9A and 9B illustrate an electronic device.

FIG. 9A illustrates an electronic book reader (also referred to as an e-book reader) which can include housings 9630, a display portion 9631, operation keys 9632, a solar cell 9633, and a charge and discharge control circuit 9634. The electronic book reader illustrated in FIG. 9A has a function of displaying various kinds of data (e.g., a still image, a moving image, and a text image) on the display portion, a function of displaying a calendar, a date, the time, or the like on the display portion, a function of operating or editing the data displayed on the display portion, a function of controlling processing by various kinds of software (programs), and the like. Note that in FIG. 9A, the charge and discharge control circuit 9634 has a battery 9635 and a DCDC converter (hereinafter, abbreviated to as a converter) 9636 as an example. The liquid crystal display device shown in any of Embodiments 1 to 11 can be applied to the display portion 9631, whereby an electronic book reader with high contrast, high visibility, and low power consumption can be provided.

In the case of using a transflective or reflective liquid crystal display device as the display portion 9631 in the structure illustrated in FIG. 9A, the electronic book reader may be used in a comparatively bright environment. This case is preferable because power generation by the solar cell 9633 and charge by the battery 9635 can be effectively performed. The solar cell 9633 can be provided on a space (a surface or a rear surface) of the housing 9630 as appropriate, which is also preferable because the battery 9635 can be efficiently charged. When a lithium ion battery is used as the battery 9635, there is an advantage of downsizing or the like.

Figure 9B:
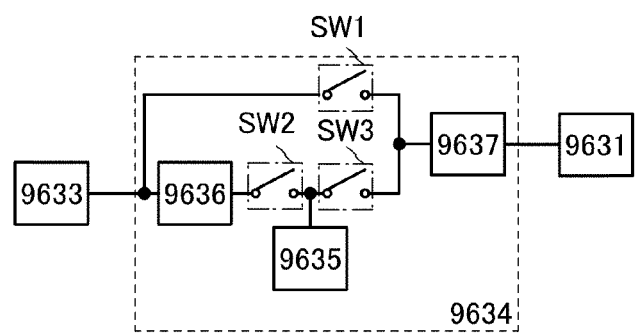

The configuration and operation of the charge and discharge control circuit 9634 illustrated in FIG. 9A will be described with reference to a block diagram of FIG. 9B. The solar cell 9633, the battery 9635, the converter 9636, a converter 9637, switches SW1 to SW3, and the display portion 9631 are illustrated in FIG. 9B, and the battery 9635, the converter 9636, the converter 9637, and the switches SW1 to SW3 correspond to the charge and discharge control circuit 9634.

First, an example of the operation in the case where power is generated by the solar cell 9633 using external light is described. The power generated by the solar cell 9633 is raised or lowered by the converter 9636 so as to be a voltage for charging the battery 9635. Then, when the power from the solar cell 9633 is used for the operation of the display portion 9631, the switch SW1 is turned on and the power is raised or lowered by the converter 9637 so as to be a voltage needed for the display portion 9631. When display on the display portion 9631 is not performed, the switch SW1 is turned off and the switch SW2 is turned on so that charge of the battery 9635 can be performed.

Next, the operation in the case where power is not generated by the solar cell 9633 using external light is described. The power stored in the battery 9635 is raised or lowered by the converter 9637 by turning on the switch SW3. Then, power from the battery 9635 is used for the operation of the display portion 9631.

Although the solar cell 9633 is shown as an example of a unit for charge, charge of the battery 9635 may be performed with another means. In addition, a combination of the solar cell 9633 and another unit for charge may be used.

Figure 10A:
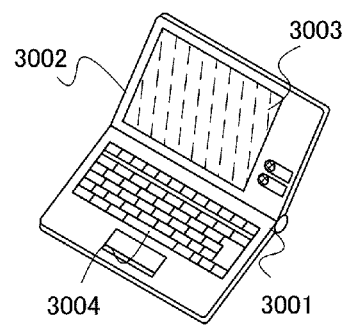
FIGS. 10A to 10F illustrate electronic devices.

FIG. 10A illustrates a laptop personal computer, which includes a main body 3001, a housing 3002, a display portion 3003, a keyboard 3004, and the like. The liquid crystal display device shown in any of Embodiments 1 to 11 can be applied to the display portion 3003, whereby a laptop personal computer with high contrast, high visibility, and low power consumption can be provided.

Figure 10B:
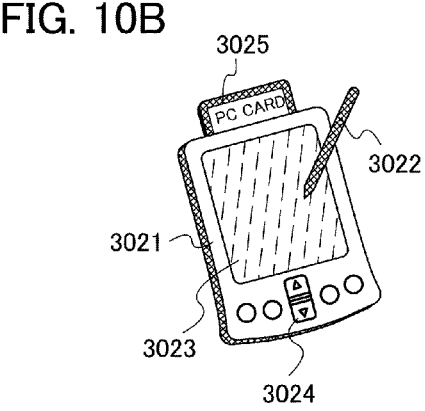

FIG. 10B is a personal digital assistant (PDA) including a display portion 3023, an external interface 3025, an operation button 3024, and the like in a main body 3021. In addition, a stylus 3022 is provided as an accessory for operation. The liquid crystal display device shown in any of Embodiments 1 to 11 can be applied to the display portion 3023, whereby a personal digital assistant (PDA) with high contrast, high visibility, and low power consumption can be provided.

Figure 10C:
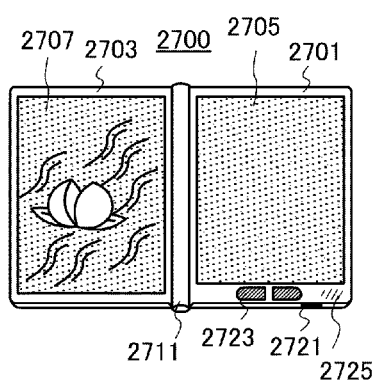

FIG. 10C illustrates an example of an electronic book reader. For example, an electronic book reader 2700 includes two housings, a housing 2701 and a housing 2703. The housing 2701 and the housing 2703 are combined with a hinge 2711 so that the electronic book reader 2700 can be opened and closed with the hinge 2711 as an axis. With such a structure, the electronic book reader 2700 can operate like a paper book.

A display portion 2705 and a display portion 2707 are incorporated in the housing 2701 and the housing 2703, respectively. The display portion 2705 and the display portion 2707 may display one image or different images. In the structure where different images are displayed on the above display portions, for example, the right display portion (the display portion 2705 in FIG. 10C) can display text and the left display portion (the display portion 2707 in FIG. 10C) can display images. The liquid crystal display device shown in any of Embodiments 1 to 11 can be applied to the display portion 2705 and the display portion 2707, whereby an electronic book reader with high contrast, high visibility, and low power consumption can be provided.

FIG. 10C illustrates the example in which the housing 2701 is provided with an operation portion and the like. For example, the housing 2701 is provided with a power switch 2721, operation keys 2723, a speaker 2725, and the like. With the operation keys 2723, pages can be turned. Note that a keyboard, a pointing device, or the like may be provided on the surface of the housing, on which the display portion is provided. Furthermore, an external connection terminal (an earphone terminal, a USB terminal, or the like), a recording medium insertion portion, and the like may be provided on the back surface or the side surface of the housing. Moreover, the electronic book reader 2700 may have a function of an electronic dictionary.

The electronic book reader 2700 may have a configuration capable of wirelessly transmitting and receiving data. Through wireless communication, desired book data or the like can be purchased and downloaded from an electronic book server.

Figure 10D:
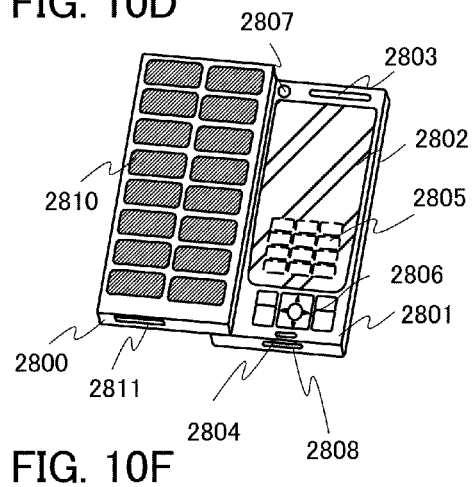

FIG. 10D illustrates a mobile phone, which includes two housings, a housing 2800 and a housing 2801. The housing 2801 includes a display panel 2802, a speaker 2803, a microphone 2804, a pointing device 2806, a camera lens 2807, an external connection terminal 2808, and the like. In addition, the housing 2800 includes a solar cell 2810 for charging the mobile phone, an external memory slot 2811, and the like. Further, an antenna is incorporated in the housing 2801. The liquid crystal display device shown in any of Embodiments 1 to 11 can be applied to the display panel 2802, whereby a mobile phone with high contrast, high visibility, and low power consumption can be provided.

The display panel 2802 is provided with a touch panel. A plurality of operation keys 2805 which are displayed as images are illustrated by dashed lines in FIG. 10D. Note that a boosting circuit by which a voltage output from the solar cell 2810 is increased to be sufficiently high for each circuit is also included.

In the display panel 2802, the display direction can be appropriately changed depending on a usage pattern. Further, the mobile phone is provided with the camera lens 2807 on the same surface as the display panel 2802, and thus it can be used as a video phone. The speaker 2803 and the microphone 2804 can be used for videophone calls, recording and playing sound, and the like as well as voice calls. Moreover, the housing 2800 and the housing 2801 developed as illustrated in FIG. 10D can be slid so that one is lapped over the other; thus, the size of the mobile phone can be reduced, which makes the mobile phone suitable for being carried.

The external connection terminal 2808 can be connected to an AC adapter and various types of cables such as a USB cable, and charging and data communication with a personal computer or the like are possible. Moreover, a large amount of data can be stored in a storage medium inserted into the external memory slot 2811 and can be moved.

In addition to the above functions, an infrared communication function, a television reception function, or the like may be provided.

Figure 10E:
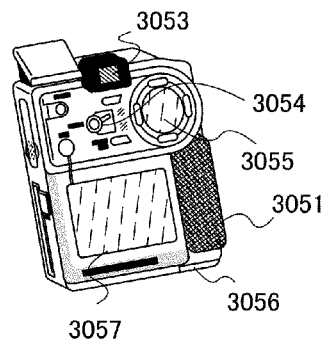

FIG. 10E illustrates a digital video camera which includes a main body 3051, a display portion A 3057, an eyepiece 3053, an operation switch 3054, a display portion B 3055, a battery 3056, and the like. The liquid crystal display device shown in any of Embodiments 1 to 11 can be applied to the display portion A 3057 and the display portion B 3055, whereby a digital video camera with high contrast, high visibility, and low power consumption can be provided.

Figure 10F:
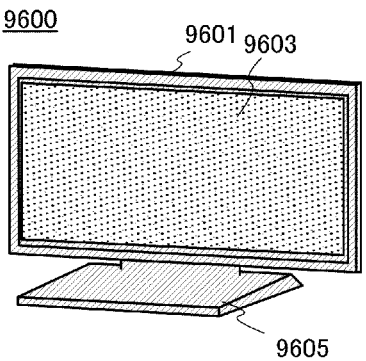

FIG. 10F illustrates an example of a television set. In a television set 9600, a display portion 9603 is incorporated in a housing 9601. The display portion 9603 can display images. Here, the housing 9601 is supported by a stand 9605. The liquid crystal display device shown in any of Embodiments 1 to 11 can be applied to the display portion 9603, whereby a television set with high contrast, high visibility, and low power consumption can be provided.

The television set 9600 can be operated by an operation switch of the housing 9601 or a separate remote controller. Further, the remote controller may be provided with a display portion for displaying data output from the remote controller.

Note that the television set 9600 is provided with a receiver, a modem, and the like. With the use of the receiver, general television broadcasting can be received. Moreover, when the television set is connected to a communication network with or without wires via the modem, one-way (from a sender to a receiver) or two-way (between a sender and a receiver or between receivers) data communication can be performed.

This embodiment can be implemented in appropriate combination with the structures described in the other embodiments.

This application is based on Japanese Patent Application serial no. 2010-091711 filed with Japan Patent Office on Apr. 12, 2010, the entire contents of which are hereby incorporated by reference.

What is claimed is:

1. A liquid crystal display device comprising:
a first substrate provided with a first electrode layer;
a second substrate provided with a second electrode layer; and
a liquid crystal layer including a liquid crystal material exhibiting a blue phase between the first substrate and the second substrate,
wherein the first electrode layer and the second electrode layer project into the liquid crystal layer with the liquid crystal layer interposed therebetween, and
wherein sum of a maximum film thickness of the first electrode layer and a maximum film thickness of the second electrode layer is greater than a maximum thickness of the liquid crystal layer.

2. The liquid crystal display device according to claim 1, wherein the first electrode layer and the second electrode layer each have a comb-like shape.

3. The liquid crystal display device according to claim 1, wherein the first electrode layer and the second electrode layer are in contact with the liquid crystal layer.

4. The liquid crystal display device according to claim 1, wherein the liquid crystal layer comprises a chiral agent.

5. The liquid crystal display device according to claim 1, wherein the liquid crystal layer comprises a photocurable resin and a photopolymerization initiator.

6. The liquid crystal display device according to claim 1,
wherein a transistor is provided between the first substrate and the first electrode layer; and
wherein the first electrode layer is electrically connected to the transistor.

7. The liquid crystal display device according to claim 6, wherein the transistor comprises an oxide semiconductor layer.

8. The liquid crystal display device according to claim 1, wherein the first electrode layer and the second electrode layer are configured to form an electric field substantially parallel to the first substrate and the second substrate in the liquid crystal layer.

9. A liquid crystal display device comprising:
a first substrate provided with a first electrode layer;
a second substrate provided with a second electrode layer; and
a liquid crystal layer including a liquid crystal material exhibiting a blue phase between the first substrate and the second substrate,
wherein the first electrode layer and the second electrode layer project into the liquid crystal layer with the liquid crystal layer interposed therebetween,
wherein a distance between the first electrode layer and the second electrode layer is a distance at which a liquid crystal in the liquid crystal layer between the first electrode layer and the second electrode layer responds to a voltage applied to the first electrode layer and the second electrode layer, and
wherein sum of a maximum film thickness of the first electrode layer and a maximum film thickness of the second electrode layer is greater than a maximum thickness of the liquid crystal layer.

10. The liquid crystal display device according to claim 9, wherein the first electrode layer and the second electrode layer each have a comb-like shape.

11. The liquid crystal display device according to claim 9, wherein the first electrode layer and the second electrode layer are in contact with the liquid crystal layer.

12. The liquid crystal display device according to claim 9, wherein the liquid crystal layer comprises a chiral agent.

13. The liquid crystal display device according to claim 9, wherein the liquid crystal layer comprises a photocurable resin and a photopolymerization initiator.

14. The liquid crystal display device according to claim 9,
wherein a transistor is provided between the first substrate and the first electrode layer; and
wherein the first electrode layer is electrically connected to the transistor.

15. The liquid crystal display device according to claim 14, wherein the transistor comprises an oxide semiconductor layer.

16. The liquid crystal display device according to claim 9, wherein the first electrode layer and the second electrode layer are configured to form an electric field substantially parallel to the first substrate and the second substrate in the liquid crystal layer.

17. A liquid crystal display device comprising:
a first substrate and a second substrate between which a liquid crystal layer including a liquid crystal material exhibiting a blue phase is interposed;
a rib-shaped first structure body which projects into the liquid crystal layer from a surface of the first substrate on the liquid crystal layer side;

a rib-shaped second structure body which projects into the liquid crystal layer from a surface of the second substrate on the liquid crystal layer side;

a first electrode layer which covers top and side surfaces of the rib-shaped first structure body; and a second electrode layer which covers top and side surfaces of the rib-shaped second structure body, wherein the first electrode layer and the second electrode layer are arranged with the liquid crystal layer interposed therebetween, and wherein sum of a maximum film thickness of the rib-shaped first structure body and a maximum film thickness of the rib-shaped second structure body is greater than a maximum thickness of the liquid crystal layer.

18. The liquid crystal display device according to claim 17, wherein the rib-shaped first structure body and the rib-shaped second structure body each have a comb-like shape.

19. The liquid crystal display device according to claim 17, wherein the first electrode layer and the second electrode layer each have a comb-like shape.

20. The liquid crystal display device according to claim 17, wherein the first electrode layer and the second electrode layer are in contact with the liquid crystal layer.

21. The liquid crystal display device according to claim 17, wherein the liquid crystal layer comprises a chiral agent.

22. The liquid crystal display device according to claim 17, wherein the liquid crystal layer comprises a photocurable resin and a photopolymerization initiator.

23. The liquid crystal display device according to claim 17,
wherein a transistor is provided between the first substrate and the first electrode layer; and
wherein the first electrode layer is electrically connected to the transistor.

24. The liquid crystal display device according to claim 23, wherein the transistor comprises an oxide semiconductor layer.

25. The liquid crystal display device according to claim 17, wherein the first electrode layer and the second electrode layer are configured to form an electric field substantially parallel to the first substrate and the second substrate in the liquid crystal layer.

26. A liquid crystal display device comprising:
a first substrate and a second substrate between which a liquid crystal layer including a liquid crystal material exhibiting a blue phase is interposed;
a rib-shaped first structure body which projects into the liquid crystal layer from a surface of the first substrate on the liquid crystal layer side;
a rib-shaped second structure body which projects into the liquid crystal layer from a surface of the second substrate on the liquid crystal layer side;
a first electrode layer which covers top and side surfaces of the rib-shaped first structure body; and
a second electrode layer which covers top and side surfaces of the rib-shaped second structure body,
wherein the first electrode layer and the second electrode layer are arranged with the liquid crystal layer interposed therebetween; and
wherein a distance between the first electrode layer and the second electrode layer is a distance at which a liquid crystal in the liquid crystal layer between the first electrode layer and the second electrode layer responds to a voltage applied to the first electrode layer and the second electrode layer, and
wherein sum of a maximum film thickness of the rib-shaped first structure body and a maximum film thickness of the rib-shaped second structure body is greater than a maximum thickness of the liquid crystal layer.

27. The liquid crystal display device according to claim 26, wherein the rib-shaped first structure body and the rib-shaped second structure body each have a comb-like shape.

28. The liquid crystal display device according to claim 26, wherein the first electrode layer and the second electrode layer each have a comb-like shape.

29. The liquid crystal display device according to claim 26, wherein the first electrode layer and the second electrode layer are in contact with the liquid crystal layer.

30. The liquid crystal display device according to claim 26, wherein the liquid crystal layer comprises a chiral agent.

31. The liquid crystal display device according to claim 26, wherein the liquid crystal layer comprises a photocurable resin and a photopolymerization initiator.

32. The liquid crystal display device according to claim 26,
wherein a transistor is provided between the first substrate and the first electrode layer; and
wherein the first electrode layer is electrically connected to the transistor.

33. The liquid crystal display device according to claim 32, wherein the transistor comprises an oxide semiconductor layer.

34. The liquid crystal display device according to claim 26, wherein the first electrode layer and the second electrode layer are configured to form an electric field substantially parallel to the first substrate and the second substrate in the liquid crystal layer.

* * * * *